United States Patent
Miller et al.

(10) Patent No.: US 11,381,747 B2
(45) Date of Patent: *Jul. 5, 2022

(54) DUAL CAMERA MAGNET ARRANGEMENT

(71) Applicant: Apple Inc., Cupertino, CA (US)

(72) Inventors: Scott W. Miller, Los Gatos, CA (US); Alfred N. Mireault, Cambridge, MA (US); Simon S. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/180,819

(22) Filed: Feb. 21, 2021

(65) Prior Publication Data

US 2021/0176400 A1 Jun. 10, 2021

Related U.S. Application Data

(63) Continuation of application No. 16/721,803, filed on Dec. 19, 2019, now Pat. No. 10,931,877, which is a
(Continued)

(51) Int. Cl.
*H04N 5/228* (2006.01)
*H04N 5/232* (2006.01)
(Continued)

(52) U.S. Cl.
CPC ........... *H04N 5/23287* (2013.01); *G02B 7/08* (2013.01); *G02B 7/09* (2013.01); *G02B 13/001* (2013.01);
(Continued)

(58) Field of Classification Search
CPC ............. H04N 5/23287; H04N 5/2253; H04N 5/2257; H04N 5/2258; G02B 7/08; G02B 13/001; G02B 27/646
(Continued)

(56) References Cited

U.S. PATENT DOCUMENTS

| 4,796,755 A | 1/1989 | Ardenti |
| 7,623,177 B2 | 11/2009 | Nakamura et al. |

(Continued)

FOREIGN PATENT DOCUMENTS

| CN | 102269857 | 12/2011 |
| CN | 202172446 | 3/2012 |

(Continued)

OTHER PUBLICATIONS

Examination Report from Australian Patent No. 2018100438, dated Jun. 26, 2018, (Apple inc.) pp. 1-6.
(Continued)

*Primary Examiner* — Usman A Khan
(74) *Attorney, Agent, or Firm* — Robert C. Kowert; Kowert, Hood, Munyon, Rankin & Goetzel, P.C.

(57) ABSTRACT

Some embodiments include a camera system having a first camera unit and a second camera unit. The first camera unit includes an autofocus actuator. The autofocus actuator includes a first plurality of magnets for autofocus motion control of components of a first optical package. The first plurality of magnets is positioned to generate magnetic fields aligned in parallel with a first magnetic axis at a right angle to the optical axis of the first optical package. The second camera unit includes an optical image stabilization and autofocus actuator. The optical image stabilization and autofocus actuator includes a second plurality of magnets positioned to generate magnetic fields aligned along a second magnet axis at 45-degrees to the first magnetic axis. The second camera unit includes a third plurality of magnets positioned to generate magnetic fields aligned along a third magnetic axis at 135-degrees to the first magnetic axis.

20 Claims, 11 Drawing Sheets

Related U.S. Application Data continuation of application No. 15/722,848, filed on Oct. 2, 2017, now Pat. No. 10,516,826, which is a continuation of application No. 15/043,136, filed on Feb. 12, 2016, now Pat. No. 9,781,345.

(60) Provisional application No. 62/201,547, filed on Aug. 5, 2015, provisional application No. 62/116,296, filed on Feb. 13, 2015.

(51) Int. Cl.
*H04N 5/225* (2006.01)
*G02B 7/08* (2021.01)
*G02B 27/64* (2006.01)
*G02B 7/09* (2021.01)
*G02B 13/00* (2006.01)

(52) U.S. Cl.
CPC ......... *G02B 27/646* (2013.01); *H04N 5/2253* (2013.01); *H04N 5/2257* (2013.01); *H04N 5/2258* (2013.01)

(58) Field of Classification Search
USPC .................................................. 348/208.11
See application file for complete search history.

(56) References Cited

U.S. PATENT DOCUMENTS

| | | | |
|---|---|---|---|
| 7,724,300 B2 | 5/2010 | Misawa et al. | |
| 8,294,780 B2 | 10/2012 | Chang | |
| 8,542,287 B2 | 9/2013 | Griffith et al. | |
| 8,670,195 B2 | 3/2014 | Ikushima et al. | |
| 8,731,390 B2 | 5/2014 | Goldenberg et al. | |
| 8,792,782 B1 * | 7/2014 | Cheng | G03B 17/14 396/75 |
| 8,885,096 B2 | 11/2014 | Vakil | |
| 9,083,873 B1 | 7/2015 | Lewkow | |
| 9,185,291 B1 | 9/2015 | Shabtay et al. | |
| 9,392,188 B2 | 7/2016 | Shabtay et al. | |
| 9,413,972 B2 | 8/2016 | Shabtay et al. | |
| 9,769,389 B2 | 9/2017 | Miller et al. | |
| 9,774,787 B2 | 9/2017 | Miller et al. | |
| 9,781,345 B1 | 10/2017 | Miller et al. | |
| 10,516,826 B2 | 12/2019 | Miller et al. | |
| 10,931,877 B2 | 2/2021 | Miller et al. | |
| 2003/0020814 A1 | 1/2003 | Ono | |
| 2004/0212794 A1 * | 10/2004 | Mizuno | G03B 27/58 355/75 |
| 2006/0280492 A1 * | 12/2006 | Chang | G03B 13/36 396/133 |
| 2007/0146503 A1 | 6/2007 | Shiraki | |
| 2008/0030592 A1 | 2/2008 | Border et al. | |
| 2008/0219654 A1 | 9/2008 | Border et al. | |
| 2010/0097443 A1 | 4/2010 | Lablans | |
| 2011/0052164 A1 | 3/2011 | Huang et al. | |
| 2011/0169920 A1 | 7/2011 | Ryu et al. | |
| 2011/0228111 A1 | 9/2011 | Imagawa | |
| 2012/0026366 A1 | 2/2012 | Golan et al. | |
| 2012/0154614 A1 | 6/2012 | Moriya et al. | |
| 2013/0028581 A1 | 1/2013 | Yeung et al. | |
| 2013/0044382 A1 | 2/2013 | Phoon et al. | |
| 2013/0141541 A1 | 6/2013 | Jung et al. | |
| 2013/0162777 A1 | 6/2013 | Wu et al. | |
| 2013/0194466 A1 | 8/2013 | Cheng et al. | |
| 2013/0242057 A1 | 9/2013 | Hong et al. | |
| 2013/0242181 A1 | 9/2013 | Phoon et al. | |
| 2014/0177056 A1 | 6/2014 | Hayashi et al. | |
| 2014/0340537 A1 | 11/2014 | Eromaki | |
| 2015/0029601 A1 | 1/2015 | Dror et al. | |
| 2015/0070781 A1 | 3/2015 | Cheng et al. | |
| 2015/0085174 A1 | 3/2015 | Shabtay et al. | |
| 2015/0109468 A1 | 4/2015 | Laroia | |
| 2015/0177479 A1 | 6/2015 | Lee et al. | |
| 2015/0179384 A1 | 6/2015 | Chen et al. | |
| 2015/0244942 A1 | 8/2015 | Shabtay et al. | |
| 2015/0244949 A1 | 8/2015 | Laroia et al. | |
| 2015/0316744 A1 | 11/2015 | Chen | |
| 2016/0018720 A1 * | 1/2016 | Bachar | G02B 7/08 359/824 |
| 2016/0112650 A1 | 4/2016 | Laroia et al. | |
| 2016/0182821 A1 | 6/2016 | Shabtay et al. | |
| 2016/0316150 A1 | 10/2016 | Eromaki | |
| 2017/0094180 A1 | 3/2017 | Miller et al. | |
| 2017/0094183 A1 | 3/2017 | Miller et al. | |
| 2017/0094187 A1 | 3/2017 | Sharma et al. | |
| 2017/0315376 A1 | 11/2017 | Hu et al. | |
| 2018/0027185 A1 | 1/2018 | Miller et al. | |
| 2018/0046063 A1 | 2/2018 | Sharma | |

FOREIGN PATENT DOCUMENTS

| | | |
|---|---|---|
| CN | 103163716 | 6/2013 |
| CN | 104054020 | 9/2014 |
| CN | 203933331 | 11/2014 |
| CN | 104267559 | 1/2015 |
| CN | 204305162 | 4/2015 |
| CN | 104767915 | 7/2015 |
| CN | 104834158 | 8/2015 |
| CN | 105024516 | 11/2015 |
| CN | 105187695 | 12/2015 |
| EP | 2802937 | 11/2014 |
| TW | 1498658 | 9/2013 |
| TW | I498658 | 9/2013 |
| TW | 201518838 | 5/2015 |
| TW | 201518854 | 5/2015 |
| WO | 2015001519 | 1/2015 |
| WO | 2015015383 | 2/2015 |
| WO | 2015068056 | 5/2015 |
| WO | 2015068061 | 5/2015 |
| WO | 2015081563 | 6/2015 |
| WO | 2015124966 | 8/2015 |

OTHER PUBLICATIONS

Utility Model Patentability Evaluation Report from Chinese Patent No. ZL2016210314866, English Translation & Chinese Version, Apple Inc., pp. 1-15.
International Search Report & Written Opinion from PCT/US2016/048475, dated Nov. 2, 2016, Apple Inc., pp. 1-12.
U.S. Appl. No. 15/240,956, filed Aug. 18, 2016, Shashank Sharma.

* cited by examiner

DUAL CAMERA MAGNET ARRANGEMENT

This application is a continuation of U.S. patent application Ser. No. 16/721,803, filed Dec. 19, 2019, which is a continuation of U.S. patent application Ser. No. 15/722,848, filed Oct. 2, 2017, now U.S. Pat. No. 10,516,826, which is a continuation of U.S. patent application Ser. No. 15/043,136, filed Feb. 12, 2016, now U.S. Pat. No. 9,781,345, which claims benefit of priority to U.S. Provisional Application No. 62/116,269, filed Feb. 13, 2015, and claims benefit of priority to U.S. Provisional Application No. 62/201,547 filed Aug. 5, 2015, which are hereby incorporated by reference in their entirety.

BACKGROUND

Technical Field

This disclosure relates generally to control of the motion of mobile components, relative to static components, based at least in part upon a linear actuator mechanism using Lorentz forces, also referred to herein as a Lorentz actuator mechanism.

Description of the Related Art

For small devices, including high-end miniature cameras, it is common to configure certain components included in the devices to be movably adjusted, relative to other components. In miniature cameras, such configuration can include configuring one or more components to enable an auto-focus' (AF) function, whereby the object focal distance is adjusted to allow objects at different distances to be in sharp focus at the image plane, to be captured by a digital image sensor. There have been many proposals for achieving such adjustments of mobile components, relative to static components, including adjustment of focal position.

For example, with regard to miniature camera devices, the most common solution is to move the whole optical lens as a single rigid body along the optical axis. Positions of the lens closer to the image sensor correspond to object focal distances further from the camera. Demands on improvements to performance of such miniature cameras are constant, as are demands for continued miniaturization, given the added features and devices added to such mobile devices.

In particular, high image quality is easier to achieve if the lens motion along the optical axis is accompanied by minimal parasitic motion in the other degrees of freedom, particularly tilt about axes orthogonal to the optical axis.

Further to this, there is a strong desire, for a given size of camera, to fit bigger lenses and image sensors to improve image quality, and hence there is a desire to reduce the size of components such as actuator mechanisms. However, some small-sized components, including various components included in actuator mechanisms, can be relatively complex to assemble and can be vulnerable to failure, based at least in part upon small size and complexity of various components.

SUMMARY OF EMBODIMENTS

Some embodiments provide a camera system having a first camera unit and a second camera unit. The first camera unit includes an autofocus actuator. The autofocus actuator includes a first plurality of magnets for autofocus motion control of components of a first optical package. The first plurality of magnets is positioned to generate magnetic fields aligned in parallel with a first magnetic axis at a right angle to the optical axis of the first optical package. The second camera unit includes an optical image stabilization and autofocus actuator. The optical image stabilization and autofocus actuator includes a second plurality of magnets positioned to generate magnetic fields aligned along a second magnet axis at 45-degrees to the first magnetic axis. The second camera unit includes a third plurality of magnets positioned to generate magnetic fields aligned along a third magnetic axis at 135-degrees to the first magnetic axis.

Figure 1A:
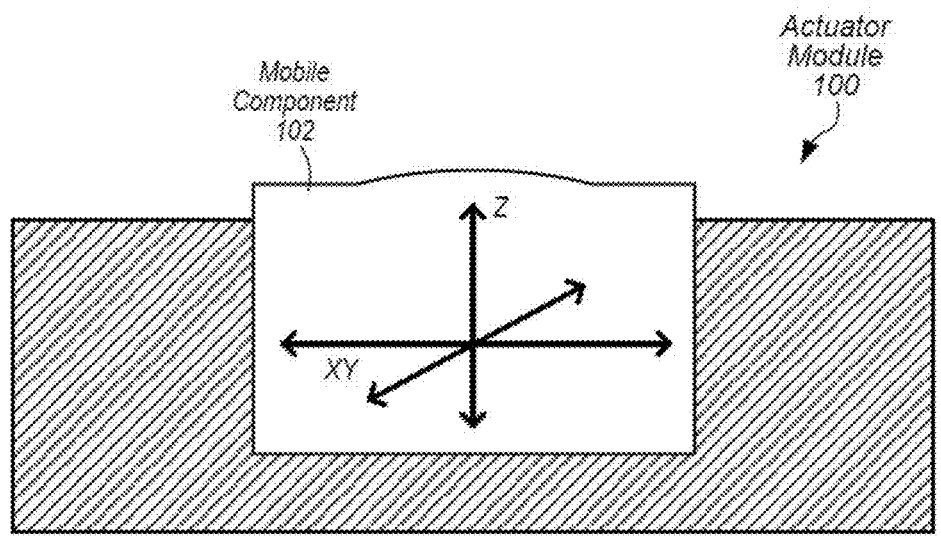
FIG. 1A illustrates motion of a mobile component, relative to a static component, within an actuator module, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Some embodiments provide an apparatus for controlling the motion of mobile components relative to static components. The apparatus can include linear actuators that controls the motion of the mobile components based at least in part upon Lorentz forces. Such linear actuators can be referred to herein as actuator mechanisms. In some embodiments, at least the mobile components included in a camera components or camera systems, such that the actuator mechanisms control the motion of optics carriers, which themselves include one or more optics components and can include one or more optical lenses, relative to one or more image sensors.

In some embodiments, a multifunction mobile computing device includes a first camera unit housed within the multifunction mobile computing device for capturing at a first image sensor a first image of a first visual field through a first optical package and a second camera unit housed within the multifunction mobile computing device. In some embodiments, the term optical package refers to a lens and any components physically attached to move in rigid orientation with the lens. Examples of an optical package include a lens barrel, lens stack or optical carrier. In some embodiments, the first camera unit includes an autofocus actuator. In some embodiments, the autofocus actuator includes a first plurality of magnets for autofocus motion control of components of the first optical package, and the first plurality of magnets is positioned to generate magnetic fields aligned in parallel with a first magnetic axis through a center of the first optical package at a right angle to the optical axis of the first optical package.

In some embodiments, the second camera unit includes an optical image stabilization and autofocus actuator. In some embodiments, the optical image stabilization and autofocus actuator includes a second plurality of magnets positioned to generate magnetic fields aligned along a second magnet axis at a first angle bisecting a right angle relative to the first magnetic axis for optical image stabilization and autofocus motion control of components of the second optical package, and the second camera unit includes a third plurality of magnets positioned to generate magnetic fields aligned along a third magnetic axis at a second angle bisecting a right angle relative to the first magnetic axis for optical image stabilization and autofocus motion control of components of the second optical package.

In some embodiments, the first camera unit includes a first optical package with a first focal length. In some embodiments, the second camera unit includes a second optical package with a second focal length for a first visual field. In some embodiments, the first focal length is different from the second focal length for a second visual field, and the first visual field is a subset of the second visual field.

In some embodiments, the autofocus actuator is configured to generate motion of the first optical package along an optical axis of the first optical package for autofocus adjustments without optical image stabilization.

In some embodiments, the optical image stabilization and autofocus actuator is configured both to generate motion of a second optical package along an optical axis of the second optical package for autofocus adjustments and to generate motion of the second optical package in directions orthogonal to the optical axis of the second optical package for optical image stabilization.

In some embodiments, the second camera unit includes a second camera unit for simultaneously capturing at a second image sensor a second image of a second visual field through the second optical package.

In some embodiments, a plurality of autofocus coils is affixed to the first optical package and situated between the first optical package and respective ones of the first plurality of magnets.

In some embodiments, the second camera unit of the multifunction device is installed in a second camera package located physically adjacent to a first camera package in which the first camera module is installed, and the second camera unit is located in a position along a line orthogonal to the first magnetic axis.

In some embodiments, a camera system includes a first camera unit and a second camera unit. In some embodiments, the first camera unit includes an autofocus actuator, the autofocus actuator includes a first plurality of magnets for autofocus motion control of components of a first optical package, and the first plurality of magnets is positioned to generate magnetic fields aligned in parallel with a first magnetic axis at a right angle to the optical axis of the first optical package. The second camera unit includes an optical image stabilization and autofocus actuator. The optical image stabilization and autofocus actuator includes a second plurality of magnets positioned to generate magnetic fields aligned along a second magnet axis at 45-degrees to the first magnetic axis. The second camera unit includes a third plurality of magnets positioned to generate magnetic fields aligned along a third magnetic axis at 135-degrees to the first magnetic axis.

In some embodiments, the first camera unit includes a first optical package with a first focal length. The second camera unit includes a second optical package with a second focal length, and the first focal length is different from the second focal length.

In some embodiments, the autofocus actuator is configured to generate motion of the first optical package along an optical axis of the first optical package for autofocus adjustments without optical image stabilization.

In some embodiments, the optical image stabilization and autofocus actuator is configured both to generate motion of a second optical package along an optical axis of the second optical package for autofocus adjustments and to generate motion of the second optical package in directions orthogonal to the optical axis.

In some embodiments, the second camera unit includes a second camera unit for simultaneously capturing at a second image sensor a second image of a second visual field through the second optical package. Some embodiments further include a plurality of autofocus coils affixed to the first optical package and situated between the first optical package and respective ones of the first plurality of magnets.

In some embodiments, the second camera unit of the multifunction device is installed in a second camera package located physically adjacent to a first camera package in which the first camera module is installed, and the second camera unit is located in a position along a line orthogonal to the first magnetic axis.

In some embodiments, a camera system includes a first camera unit and a second camera unit. In some embodiments, the first camera unit includes an autofocus actuator and a first image sensor. In some embodiments, the autofocus actuator includes a first plurality of magnets for autofocus motion control of components of a first optical package relative to the image sensor. In some embodiments, the first plurality of magnets is positioned to generate magnetic fields aligned in parallel with a first magnetic axis at a right angle to the optical axis of the first optical package.

In some embodiments, the second camera unit includes an optical image stabilization and autofocus actuator and a second image sensor. In some embodiments, the optical image stabilization and autofocus actuator includes a second plurality of magnets positioned to generate magnetic fields aligned along a second magnet axis at 45-degrees to the first magnetic axis, and the second camera unit includes a third plurality of magnets positioned to generate magnetic fields aligned along a third magnetic axis at 135-degrees to the first magnetic axis.

In some embodiments, the first camera unit includes a first optical package with a first focal length, the second camera unit includes a second optical package with a second focal length, and the first focal length is different from the second focal length.

In some embodiments, the autofocus actuator is configured to generate motion of the first image sensor along an optical axis of the first optical package for autofocus adjustments without optical image stabilization.

In some embodiments, the optical image stabilization and autofocus actuator is configured both to generate motion of the second image sensor along an optical axis of the second optical package for autofocus adjustments and to generate motion of the second optical package in directions orthogonal to the optical axis.

In some embodiments, a plurality of autofocus coils is affixed to the first optical package and situated between the first optical package and respective ones of the first plurality of magnets.

In some embodiments, the second camera unit of the multifunction device is installed in a second camera package located physically adjacent to a first camera package in which the first camera module is installed, and the second camera unit is located in a position along a line orthogonal to the first magnetic axis.

In some embodiments, the first camera unit includes an apparatus for controlling the motion of a mobile component relative to a static component, with multiple magnets coupled to the static component and a flat coil assembly physically coupled to the mobile component in a magnetic field of one or more magnets of the plurality of magnets and electrically coupled to a power source. Each magnet of the plurality of magnets is poled with magnetic domains substantially aligned in the same direction throughout each magnet. The flat coil assembly is configured to adjust a position of the mobile component, relative to the static component, based at least in part upon Lorentz forces. The flat coil assembly includes a set of conductor elements at least partially bounded by a set of insulator elements within an interior of the flat coil assembly. The set of conductor elements form a coil structure, within the interior of the flat coil assembly, which is configured to generate the Lorentz forces based at least in part upon an electrical current through the conductor elements.

In some embodiments, the flat coil assembly includes multiple physically coupled layers which collectively establish the coil structure within the interior of the flat coil assembly. One or more of the plurality of physically coupled layers can include a particular pattern of conductor elements and insulator elements.

In some embodiments, the flat coil assembly includes one or more flat coils, where each flat coil includes a separate set of conductor elements forming a coil structure within the respective flat coil. In some embodiments, the flat coil assembly includes multiple flat coils which are each coupled to separate sides of the mobile component. In some embodiments, the flat coils are coupled to opposite sides of the mobile component. In some embodiments, the plurality of flat coils are configured to be electrically coupled to a power source in series.

In some embodiments, the mobile component includes an optics carrier included in a camera device and including an optics component, and the flat coil assembly is configured to adjust a position of the optics carrier, relative to an image sensor in the camera device along an axis parallel to the optical axis for focus adjustment. The optics component can include one or more optical lenses.

In some embodiments, the flat coil assembly is configured to be coupled to the mobile component as a monolithic component. In some embodiments, the flat coil assembly is configured to be coupled to the mobile component in an automatic process which is independent of manual intervention. Such an automatic process can be implemented by one or more robotic mechanisms which are controlled by one or more computer systems.

In some embodiments, the flat coil assembly includes a flexible electrical connection which is physically coupled to an electrical terminal to electrically couple the flat coil assembly to the power source. The flexible electrical connection is configured to flex, to maintain the electrical coupling of the flat coil assembly and the power source, as the mobile component moves, relative to the static component.

In some embodiments, the first camera unit includes an apparatus with a Lorentz actuator mechanism configured to adjustably position a mobile component, relative to a static component, based at least in part upon Lorentz forces. The Lorentz actuator mechanism can include one or more flat coil assemblies configured to couple directly with the mobile component and generate Lorentz forces based at least in part upon an electrical current applied to the flat coil assembly. The flat coil assembly can include at least one set of conductor elements coupled in series through an interior of the one or more flat coil assemblies to collectively form a coil structure within the interior of the one or more flat coil assemblies. The coil structure is configured to generate the Lorentz forces based at least in part upon an electrical current through the conductor elements.

In some embodiments, the one or more flat coil assemblies includes a multilayer structure of multiple physically coupled layers which collectively establish the coil structure based at least in part upon the physically coupling of the layers to electrically couple the particular patterns of conductor elements. At least one layer in the plurality of layers can include a particular pattern of conductor elements and insulator elements.

In some embodiments, the one or more flat coil assemblies is configured to be coupled to the static component via one or more spring assemblies. The one or more spring assemblies can be configured to at least partially restrict a range of motion of the mobile component.

In some embodiments, the one or more flat coil assemblies includes a frame structure coupled to the mobile component assembly, and multiple flat coils coupled to opposite sides of the frame structure, such that the plurality of flat coils are positioned at opposite sides of the mobile component assembly.

In some embodiments, the one or more flat coil assemblies is configured to couple directly with the mobile component as a monolithic component.

In some embodiments, the mobile component includes an optics carrier included in a camera device and further includes an optics component. The flat coil assembly can be configured to adjust a position of the optics carrier, relative to an image sensor in the camera device along an axis parallel to the optical axis for focus adjustment of the optics component. Such focus adjustment can include auto-focusing.

In some embodiments, the flat coil assembly includes a flexible electrical connection which is configured to flex, to maintain an electrical connection between the flat coil assembly and a power source, concurrently with the flat coil assembly generating Lorentz forces to adjust a position of the mobile component, relative to the static component.

Adjustably positioning the mobile component, relative to the static component, based at least in part upon a current applied to one or more flat coil assemblies included in one or more actuator mechanisms can be controlled, at least partially, by a non-transitory, computer-readable storage medium and one or more processors (e.g., CPUs and/or GPUs) of a computing apparatus. The computer-readable storage medium may store program instructions executable by the one or more processors to cause the computing apparatus to perform calculating an equilibrium position of the mobile component relative to one or more static components in a static component assembly, detecting a current position of the mobile component relative to the static component and calculating a displacement of the mobile component by the actuator mechanism necessary to move the mobile component to the equilibrium position, as described herein. Other embodiments of the non-uniform paint loading module may be at least partially implemented by hardware circuitry and/or firmware stored, for example, in a non-volatile memory.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use one or more common physical user-interface devices, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Some embodiments include a dual-camera module or a set of camera modules for use in one or more various devices. Such devices can include one or more miniature cameras, such as those used in mobile handheld devices or other multifunction devices. For high-end miniature cameras, it is common to incorporate 'auto-focus' (AF) functionality, whereby the object focal distance is adjusted to allow objects at different distances to be in sharp focus at the image plane, to be captured by the digital image sensor. Some embodiments allow improvements to performance of such miniature cameras, as well as continued miniaturization, to accommodate added features and devices added to such mobile devices.

Some embodiments include an actuator mechanism which includes one or more Lorentz actuator mechanisms. For such actuator mechanisms, a current carrying conductor element in a magnetic field experiences a force proportional to the cross product of the current applied to the conductor element and the magnetic field. This force is known as the Lorentz force. In some embodiments, the Lorentz force is greatest if the direction of the magnetic field is orthogonal to the direction of the current flow, and the resulting force on the conductor is orthogonal to both. The Lorentz force is proportional to the magnetic field density and the current through the conductor. The conductor element can be included in a coil structure, which includes a coil formed of one or more conductor elements. Some embodiments use an actuator mechanism configured to have a substantially constant magnetic field cutting the coil element for all positions of the actuator mechanism, such that the force produced is proportional to the current through the one or more conductor elements included in the coil element. In some embodiments, the actuator mechanism includes a voice coil motor (VCM), where the coil element, and the coil structure included therein, includes a voice coil formed of one or more instances of conductor elements (which can include one or more instances of conductor wiring, conductor cabling, some combination thereof, etc.) wound to form the coil structure. Some embodiments make further use of voice coil motor technology and include an actuator architecture suitable for improving power consumption, performance, reducing size, and adding extra functionality, including optical image stabilization.

Some embodiments include a dual-camera module including a camera equipped for autofocus and a second camera configured for both autofocus and optical image stabilization. In some embodiments, the cameras each include a static component assembly which includes a photosensor configured to capture light projected onto a surface of the photosensor. In some embodiments, the cameras each include an actuator module. In some embodiments, the actuator modules each include a mobile component assembly which includes an optics assembly configured to refract light from an object field located in front of the camera onto the photosensor. In some embodiments, one or more actuator modules includes an actuator mechanism configured to move the optics assembly within the actuator module on one or more axes orthogonal to an optical axis of the camera to automatically focus an image formed by the optics assembly at the photosensor. In some embodiments, an optics assembly is suspended by one or more sets of spring assemblies on the static component assembly.

Some embodiments allow a reduction in the complexity and size of components such as actuator mechanisms. Some embodiments allow assembly of an actuator module which includes a mobile component within a mobile component assembly to be simplified and streamlined, based at least in part upon the actuator mechanism including a flat coil assembly which includes a coil structure of one or more conductor elements within an interior of the flat coil assembly. The flat coil assembly can be coupled directly to the mobile component as a monolithic component, thereby simplifying assembly of the actuator mechanism, relative to an actuator mechanism which includes a voice coil motor (VCM), as winding of one or more conductor cablings to form a coil structure is precluded. In addition, as the coil structure is located within the interior of the flat coil assembly, the conductor elements are less vulnerable to exposure and damage, relative to wound conductor cabling included in a coil element of a VCM.

An apparatus for controlling motions of a mobile component relative to an static component within a device, which can include controlling motions of an optics component relative to an image sensor within a camera device, may include an actuator mechanism for controlling the position of the mobile component relative to the static component along two axes (X, Y) orthogonal to the optical (Z) axis of the device. The apparatus may be referred to herein as an actuator module. In some embodiments, a mobile component assembly that includes the mobile component and that may also include at least some components of the actuator mechanism (e.g., magnets and/or coil elements) may be suspended on one or more sets of spring assemblies, wires, beams, etc. over a base of the actuator module. Each set of spring assemblies may be substantially parallel to an axis of motion of the mobile component. In at least some embodiments, the spring assemblies are substantially perpendicular to the axis of motion of the mobile component and are capable of bending deformations that allow the mobile component assembly to move in linear directions parallel to the axis of motion (i.e., on the Z plane). Where the actuator module includes an optical component included in a camera device, the actuator mechanism may provide autofocus for the camera device, and in some embodiments may be implemented as a voice coil motor (VCM) actuator mechanism. The actuator module may, for example, be used as or in a miniature or small form factor camera as part of a dual-camera module suitable for small, mobile multipurpose devices such as cell phones, smartphones, and pad or tablet devices. In at least some embodiments, the actuator module may also include a focusing mechanism for moving the optics component along an optical (Z) axis within the optics assembly.

Lorentz Actuator Mechanism

Figure 1B:
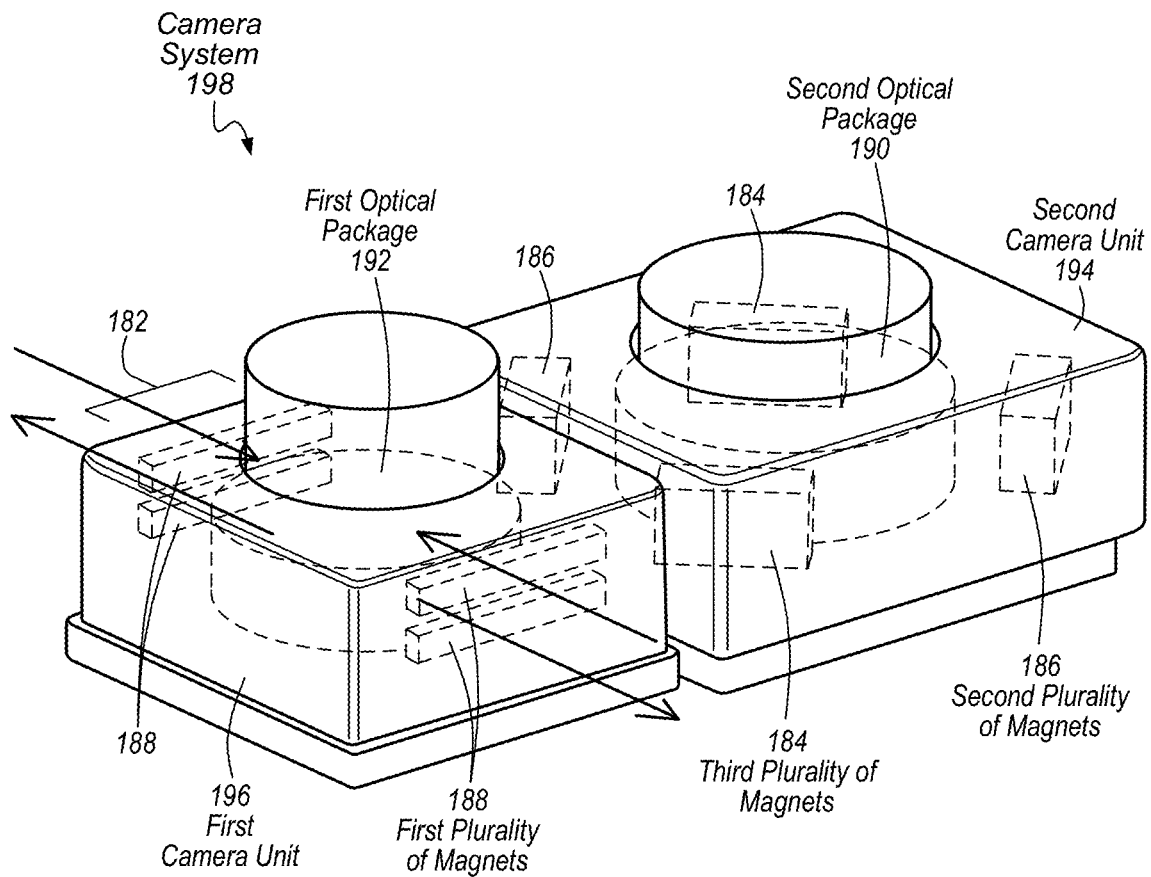
FIG. 1B depicts a dual camera arrangement, according to at least some embodiments.
Figure 1C:
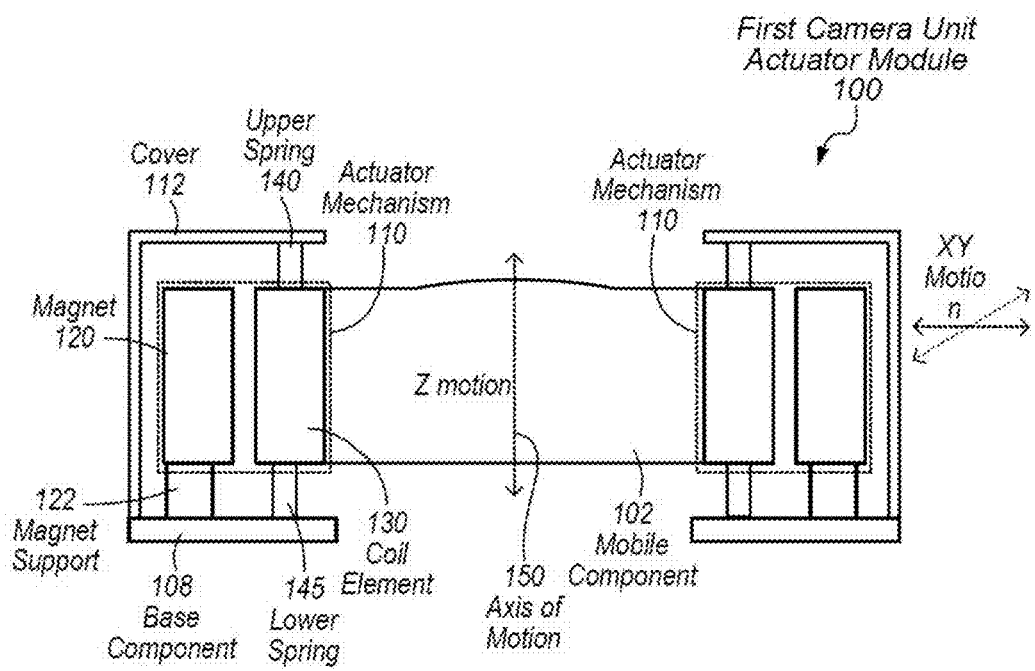
FIG. 1C illustrates motion of a mobile component, relative to a static component, within an actuator module, according to at least some embodiments.

FIG. 1A and FIG. 1C illustrate motion of a mobile component 102 within an actuator module 100, according to at least some embodiments. As shown in FIG. 1A, where the mobile component 102 includes an optics component, an actuator module 100 may provide optical image autofocusing and/or optical image stabilization for the optics component 102. In at least some embodiments, the actuator module 100 may include a Lorentz actuator mechanism, herein referred to as an "actuator mechanism", which can include a voice coil motor (VCM) actuator mechanism, a flat coil assembly actuator mechanism, some combination thereof, etc. An actuator module 100 such as a flat coil actuator module may provide motion to mobile component 102 in the Z axis. An actuator module 100 such as a voice coil motor actuator module may provide motion to mobile component 102 in the Z axis, as well as the X axis and Y axis. The Z axis motion may, for example, be for optical focusing or autofocus purposes in cameras that incorporate focusing/autofocus mechanisms. The X and Y axis motion may, for example, be for optical focusing, optical image stabilization or autofocus purposes in cameras that incorporate focusing/autofocus mechanisms. An example embodiment of an optical image focusing actuator mechanism are illustrated as actuator module 100 in FIG. 1C. An example embodiment of an optical image stabilization actuator mechanism are illustrated as an actuator module 180 in FIG. 1D. Embodiments of the actuator module 100 may, for example, be used in a miniature or small form factor camera suitable for small, mobile multipurpose devices such as cell phones, smartphones, and pad or tablet devices, as described below with respect to FIGS. 8-9. Embodiments of the actuator module 180 may, for example, be used in a miniature or small form factor camera suitable for small, mobile multipurpose devices such as cell phones, smartphones, and pad or tablet devices, as described below with respect to FIG. 8-9.

FIG. 1B depicts a dual camera arrangement, according to at least some embodiments. A camera system contains a first camera unit 198 and a second camera unit 194. In first camera unit 194, an autofocus actuator, moves a first optical package 192. The autofocus actuator includes a first plurality of magnets 188 for autofocus motion control of components of first optical package 192, and the first plurality of magnets 188 is positioned to generate magnetic fields aligned in parallel with a first magnetic axis at a right angle to the optical axis of the first optical package 192. Second camera unit 194 includes an optical image stabilization and autofocus actuator, which includes a second plurality of magnets 186 positioned to generate magnetic fields aligned along a second magnet axis at 45-degrees to the first magnetic axis, and a third plurality of magnets 184 positioned to generate magnetic fields aligned along a third magnetic axis at 135-degrees to the first magnetic axis.

In some embodiments, the first camera unit 196 includes a first optical package 192 with a first focal length, and the second camera unit 194 includes a second optical package 190 with a second focal length. In some embodiments, the autofocus actuator of first camera unit 196 is configured to generate motion of the first optical package 192 along an optical axis of the first optical package 192 for autofocus adjustments without optical image stabilization. In some embodiments, magnets of the first plurality of magnets are paired in a first pair 182 and a second pair 180. Each of first pair 182 and second pair 180 contains both an upper magnet with a field oriented north toward the first optical package 192 and a lower magnet with a field oriented north away from the first optical package 192. In the interest of enhanced visual simplicity, magnetic fields of the third plurality of magnets 184 and the second plurality of magnets 186 are not shown. In some embodiments, magnetic fields of the third plurality of magnets 184 and the second plurality of magnets 186 are oriented north toward the first optical package 192 oriented north toward the second optical package 192. As used herein, arrowheads of magnetic field vectors indicate magnetic north orientation.

In some embodiments, the optical image stabilization and autofocus actuator of second camera unit 194 is configured both to generate motion of a second optical package 190 along an optical axis of the second optical package for autofocus adjustments and to generate motion of the second optical package 190 in directions orthogonal to the optical axis of second optical package 190.

In some embodiments, the second camera unit 194 includes or is a second camera unit for simultaneously capturing at a second image sensor a second image of a second visual field through the second optical package 190. In some embodiments, a plurality of autofocus coils is affixed to the first optical package 192 and situated between the first optical package 192 and respective ones of the first plurality of magnets 188.

In some embodiments, the second camera unit 194 is installed in a second camera package located physically adjacent to a first camera package in which the first camera unit 196 is installed, and the second camera unit 194 is located in a position along a line orthogonal to the first magnetic axis.

FIG. 1C illustrates components of an example actuator module 100 (e.g., an actuator module of the first camera unit 196) that provides Z axis (autofocus) motions 150 for a mobile component 102 (e.g., first optical package 192) based at least in part upon Lorentz forces generated in one or more actuator mechanisms 110 included therein, according to some embodiments. In some embodiments, a mobile component 102 of the actuator module 100 may include an optics component (e.g., first optical package 192) that is coupled to an actuator mechanism 110 and is coupled to various elements of a static component assembly, including a base component 108 and a cover 112, via one or more sets of spring assemblies 140, 145.

The actuator mechanism 110 can include one or more magnets 120 (e.g., of first plurality of magnets 188), coil elements 130, etc. Each magnet 120 can be poled so as to generate a magnetic field, the useful component of which for the function of moving the mobile component 102 is orthogonal to the axis 150, and orthogonal to the plane of each magnet 120 proximate to the coil element 130, and magnetic fields for all magnets 120 are all either directed towards a given coil element 130, or away from the coil element 130, so that the Lorentz forces from all magnets 120 act in the same direction along the axis of motion 150.

Where the actuator mechanism 110 includes a Lorentz actuator mechanism, a given mechanism 110 can include a coil element 130 positioned in a magnetic field generated by a magnet 120 and configured to generate Lorentz forces based at least in part upon an electrical current applied to the coil element. As shown in FIG. 1C, the coil elements 130 illustrated therein are coupled, orthogonally to axis 150, to one or more external sides, also referred to as exterior sides, of the mobile component 102 which extend in parallel to axis 150. The spring assemblies 140, 145 can be flexible to allow motion of the mobile component 102 on the Z axis 150 relative to one or more static components (e.g., base 108, cover 112, magnet 120, magnet support 122, etc.) included in a static component assembly. In the illustrated embodiment, a portion of the actuator mechanism 110, the coil element 130, is coupled to the mobile component 102 to form a mobile component assembly, and the magnet 120 can be coupled to one or more portions of the static component assembly via one or more magnet support elements 122. As a result, the actuator mechanism 110 can move the mobile component assembly on the Z axis within the actuator module 100, and relative to the static component assembly, so that the coil element 130 included in the mobile component assembly moves with the mobile component 102 and relative to the magnet 120, which remains included in, and affixed to other static components included in, the static component assembly. An actuator mechanism 110 may be configured to move the mobile component 102 on the Z axis 150 within the actuator module 100 to provide focusing or autofocus for a camera, for example where the static component assembly includes an image sensor (not shown) and the mobile component 102 includes an optics carrier which accommodates one or more optics components, including one or more optical lenses.

In some embodiments, the mobile component assembly, which can include the mobile component 102 and one or more coil elements 130 of one or more actuator mechanisms 110, is at least partially suspended within the actuator module 100 on one or more sets of spring assemblies 140, 145. For example, in the illustrated embodiment, the set of spring assemblies 145 are coupled directly to base component 108, and the set of spring assemblies 140 are coupled directly to cover 112. The spring assemblies may be flexible to allow motion of the mobile component assembly which includes the mobile component 102 and coil elements 130, on the Z axis, XY axis, some combination thereof, or the like. Where the actuator module is included in a camera device, and the mobile component 102 includes an optics component, the actuator mechanisms 110 can move the mobile component assembly, and thus the mobile component 102 on the Z axis within the actuator module 100, to provide optical image focusing for the camera device.

In this way, when an electric current is applied to one or more of the coil elements 130, Lorentz forces are developed due to the presence of the magnets 120, and a force substantially parallel to the axis 150 is generated to move the mobile component 102, and one or more components included therein, along the axis 150, relative to the various static components 108, 112, 120, 122 included in the static component assembly. In addition to suspending the mobile component assembly and substantially eliminating parasitic motions, the upper spring assemblies 140 and lower spring assemblies 145 also resist the Lorentz forces generated in coil elements 130, and hence convert the forces to a displacement of the lens. This basic architecture in FIG. 1C is typical of first camera unit 196 in some embodiments.

Some embodiments further provide a drive scheme for an actuator mechanism for a miniature camera, such as may be used in a mobile handheld device or other multifunction device. Some embodiments provide a flat coil assembly actuator mechanism configuration, which uses 'fixed' magnets and a moving flat coil assembly coupled to a mobile component which includes an optics carrier that itself includes, accommodates, etc. one or more optics components. The optics carrier can include a threaded lens carrier, on which is mounted an optics component which includes one or more a threaded lens. Some embodiments further incorporate a method for assembling the actuator mechanism and a method of driving the actuator mechanism.

In some embodiments, the actuator module includes multiple separate coil elements, which can include multiple flat coils, multiple flat coil assemblies, some combination thereof, etc. Each flat coil, flat coil assembly, etc. can be located on separate sides of the mobile component and can further be accompanied by its own magnet. In order to deliver Lorentz forces in the same direction from each side of each coil, some embodiments use dual-pole magnets, where the domains in different portions of the magnet are aligned in opposite directions.

Figure 1D:
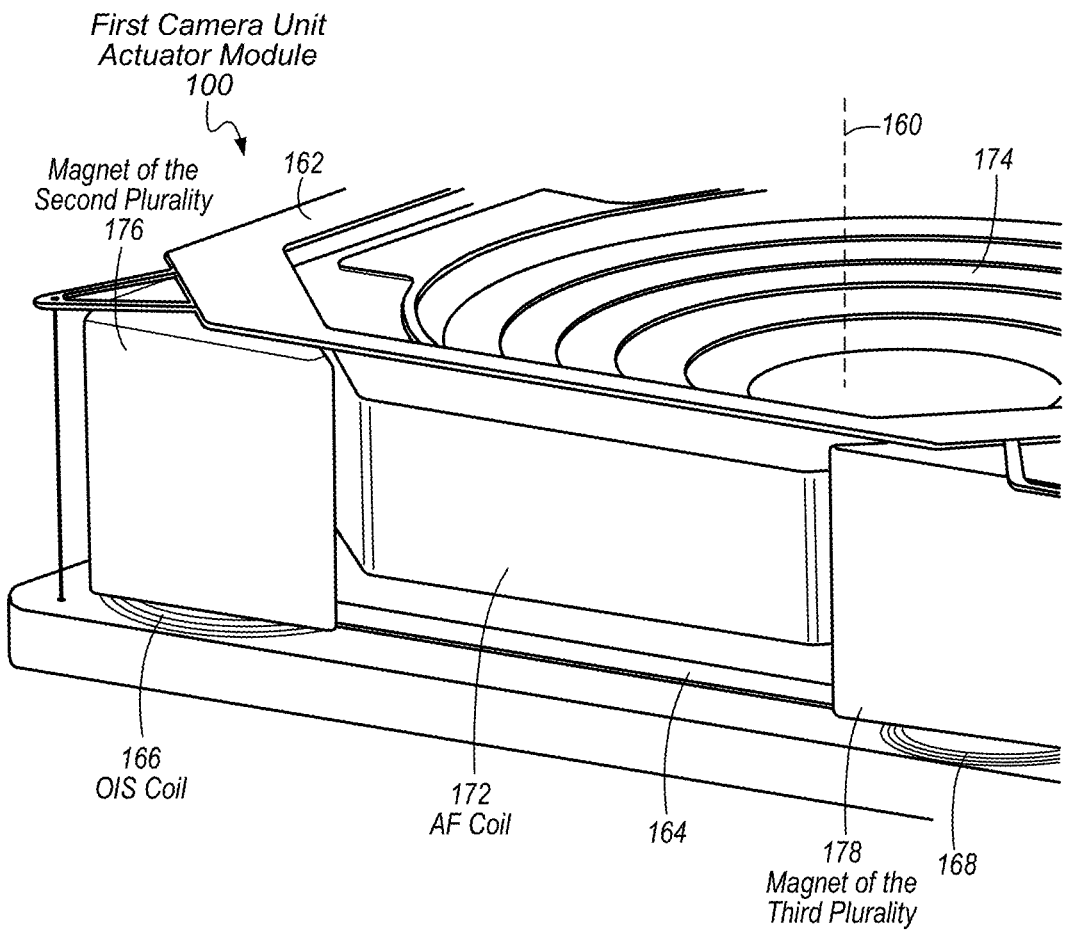
FIG. 1D depicts an actuator for a camera with autofocus and optical image stabilization, according to some embodiments.

FIG. 1D illustrates an actuator for a camera with autofocus and optical image stabilization, according to some embodiments. A basic autofocus voice coil motor configuration of actuator 170 (e.g., the actuator of second camera unit 194) includes a single autofocus coil 172 wound onto a threaded lens carrier 174, into which the lens (not shown, e.g., second optical package 190) is subsequently screwed. An autofocus yoke component (not shown) supports and houses four magnets (e.g., magnet of the second plurality 176 and magnet of the second plurality 178) in the corners. Each magnet (e.g., e.g., magnet of the second plurality 176 and magnet of the second plurality 178) is poled so as to generate a magnetic field, the useful component of which for the autofocus function is orthogonal to the optical axis 160, and orthogonal to the plane of each magnet (e.g., e.g., magnet of the second plurality 176 and magnet of the second plurality 178) proximate to the autofocus coil 172, and where the field for all four magnets are all either directed towards the autofocus coil 172, or away from the autofocus coil 172, so that the Lorentz forces from all four magnets (e.g., e.g., magnet of the second plurality 176 and magnet of the second plurality 178) act in the same direction along the optical axis 160.

The autofocus yoke (not shown) acts as the support chassis structure for the autofocus mechanism of actuator 170. The lens carrier 174 is suspended on the autofocus yoke by an upper spring 162 and a lower spring 164. In this way when an electric current is applied to autofocus coil 172, Lorentz forces are developed due to the presence of the four magnets (e.g., e.g., magnet of the second plurality 176 and magnet of the second plurality 178), and a force substantially parallel to the optical axis 160 is generated to move the lens carrier 174, and hence lens, along the optical axis 160, relative to the support structure of the autofocus mechanism of actuator 170, so as to focus the lens. In addition to suspending the lens carrier 174 and substantially eliminating parasitic motions, the upper spring 162 and lower spring 164 also resist the Lorentz forces, and hence convert the forces to a displacement of the lens. This basic architecture is typical of the second camera unit some embodiments, in which optical image stabilization function includes moving the entire autofocus mechanism of actuator 170 (supported by the autofocus yoke) in linear directions orthogonal to the optical axis 160, in response to user handshake, as detected by some means, such a two or three axis gyroscope, which senses angular velocity. The handshake of interest is the changing angular tilt of the camera in 'pitch and yaw directions', which can be compensated by said linear movements of the lens relative to the image sensor.

Embodiments achieve this two independent degree-of-freedom motion by using two pairs of optical image stabilization coils (e.g., such as 166 and 168), each pair acting together to deliver controlled motion in one linear axis orthogonal to the optical axis 160, and each pair delivering controlled motion in a direction substantially orthogonal to the other pair. These optical image stabilization coils 166 and 168 are fixed to the camera actuator 170 support structure, and when current is appropriately applied, optical image stabilization coils 166 and 168 generate Lorentz forces on the entire autofocus mechanism of actuator 170, moving it as desired. The required magnetic fields for the Lorentz forces are produced by the same four magnets (e.g., magnet of the second plurality 176 and magnet of the second plurality 178) that enable to the Lorentz forces for the autofocus function. However, since the directions of motion of the optical image stabilization movements are orthogonal to the autofocus movements, it is the fringing field of the four magnets (e.g., magnet of the second plurality 176 and magnet of the second plurality 178) that are employed, which have components of magnetic field in directions parallel to the optical axis 160.

Some embodiments include a first camera unit 196 housed within a multifunction mobile computing device for capturing at a first image sensor (not shown) a first image of a first visual field through a first optical package 192. In some embodiments, the first camera unit includes an autofocus actuator 100. The autofocus actuator includes a first plurality of magnets 120 for autofocus motion control of components of the first optical package 192, and the first plurality of magnets 120 is positioned to generate magnetic fields aligned in parallel with a first magnetic axis 150 through a center of the first optical package 192 at a right angle to the optical axis 150 of the first optical package 192.

In some embodiments a second camera unit 194 is housed within the multifunction mobile computing device. the second camera unit includes an optical image stabilization and autofocus actuator 170. The optical image stabilization and autofocus actuator 170 includes a second plurality of magnets 186 positioned to generate magnetic fields aligned along a second magnetic axis at a first angle bisecting a right angle relative to the first magnetic axis 160 for optical image stabilization and autofocus motion control of components of the second optical package 190. The second camera unit includes a third plurality of magnets 184 positioned to generate magnetic fields aligned along a third magnetic axis at a second angle bisecting a right angle relative to the first magnetic axis for optical image stabilization and autofocus motion control of components of the second optical package 190.

In some embodiments, the first camera unit 196 includes a first optical package 192 with a first focal length for a first visual field, the second camera unit 194 includes a second optical package 190 with a second focal length for a second visual field, and the first focal length is different from the second focal length.

In some embodiments, the autofocus actuator 100 is configured to generate motion of the first optical package 192 along an optical axis 152 of the first optical package 192 for autofocus adjustments without optical image stabilization.

In some embodiments, the optical image stabilization and autofocus actuator 170 is configured both to generate motion of a second optical package 190 along an optical axis 160 of the second optical package 190 for autofocus adjustments and to generate motion of the second optical package 190 in directions orthogonal to the optical axis 160 of the second optical package 190 for optical image stabilization.

In some embodiments, the second camera unit 194 includes a second camera unit for simultaneously capturing at a second image sensor a second image of a second visual field through the second optical package 190.

In some embodiments, the first camera unit includes a plurality of autofocus coils 130 affixed to the first optical package 192 and situated between the first optical package 192 and respective ones of the first plurality of magnets 120.

In some embodiments, the second camera 194 unit of the multifunction device is installed in a second camera package located physically adjacent to a first camera package in which the first camera module or first camera unit 196 is installed, and the second camera unit is located in a position along a line orthogonal to the first magnetic axis.

Figure 2:
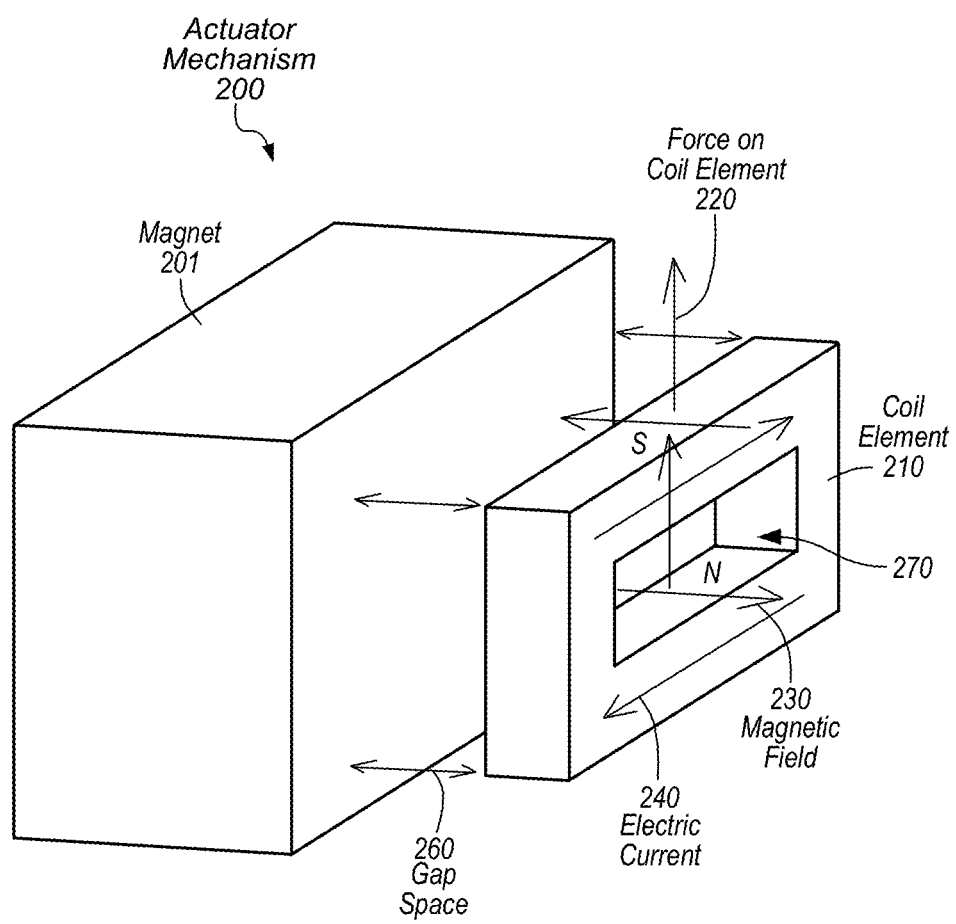
FIG. 2 illustrates a schematic of a magnet and flat coil assembly configuration, according to some embodiments.

FIG. 2 illustrates a schematic of an actuator mechanism 200 which includes a magnet 201 and flat coil assembly 210 configuration, according to some embodiments. A magnet 201 and accompanying magnetic field 230 are shown in conjunction with a flat coil assembly 210. Based at least in part upon the magnetic field 230 generated by magnet 201, electric current applied to flat coil assembly 210 can result in the generation of Lorentz forces 230, which can result in force being applied to various components coupled to the flat coil assembly 210.

Figure 3:
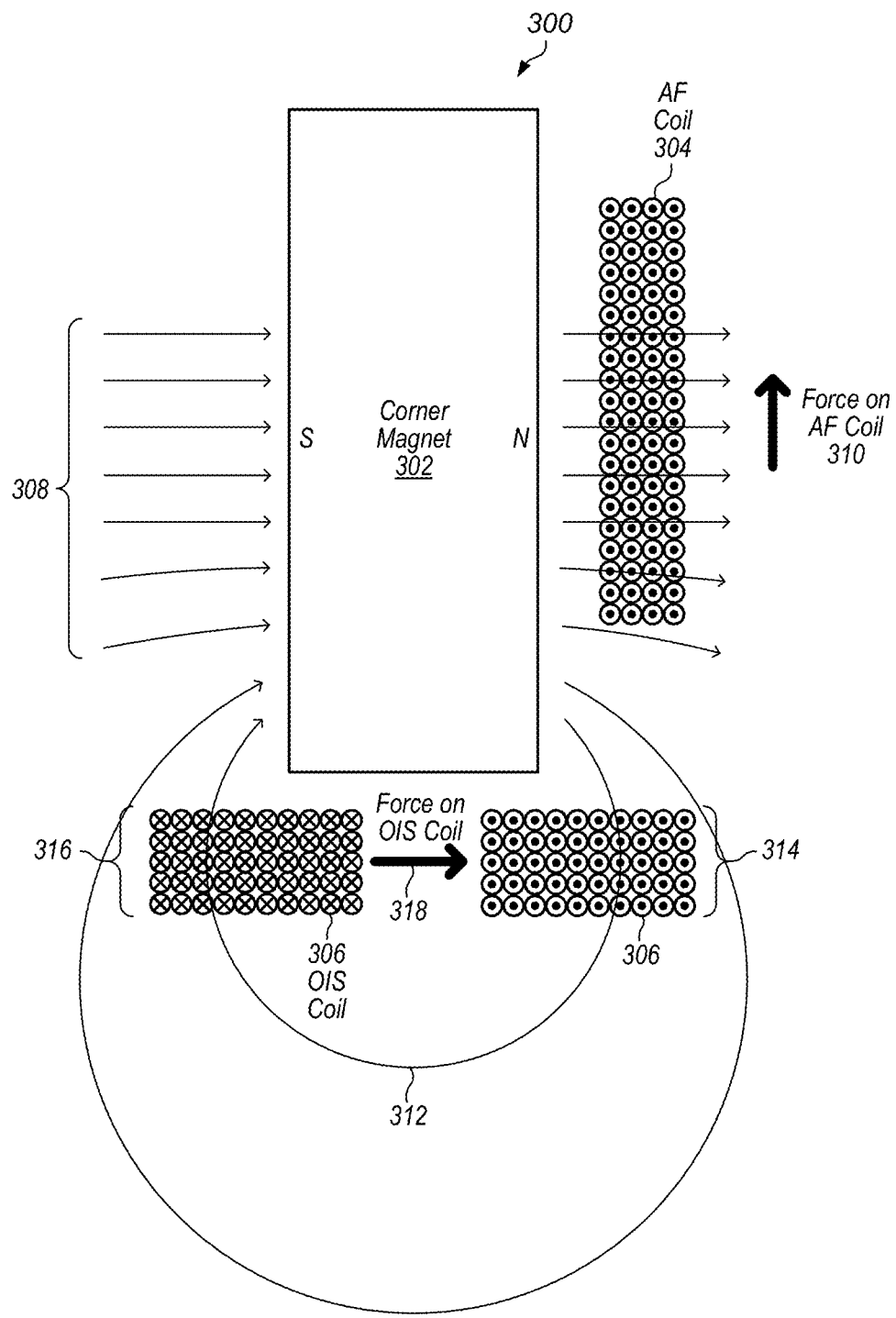
FIG. 3 depicts a schematic view of a magnet and coil configuration, according to some embodiments.

FIG. 3 illustrates a schematic view of a magnet and coil configuration, according to some embodiments. FIG. 3 is a schematic representation 300 of a cross-section, through one magnet 302, the autofocus coil 304 and an optical image stabilization coil 306. A magnetic field component 308 is 'horizontal' and enables the Lorentz force for the autofocus function 310. However, also note that the fringing field 312 cuts through each half of the optical image stabilization coil 306, with the 'vertical' component of the field 312 in the opposite direction in each half of the optical image stabilization coil 306. Note also that since the optical image stabilization coil 306 is contiguous, the direction of current flow in each half of the optical image stabilization coil 306 is also opposite. This is illustrated by the 'dots' 314 in each wire of one half of optical image stabilization coil 306 indicating current coming out of the page, whilst the 'crosses' 316 in each wire of the other half of optical image stabilization coil 306 indicating current going into the page. Hence the Lorentz force 318 generated in each half of optical image stabilization coil 306 is in the same direction, in this case to the right. And the Lorentz force in the autofocus coil 310 is upwards.

Figure 4:
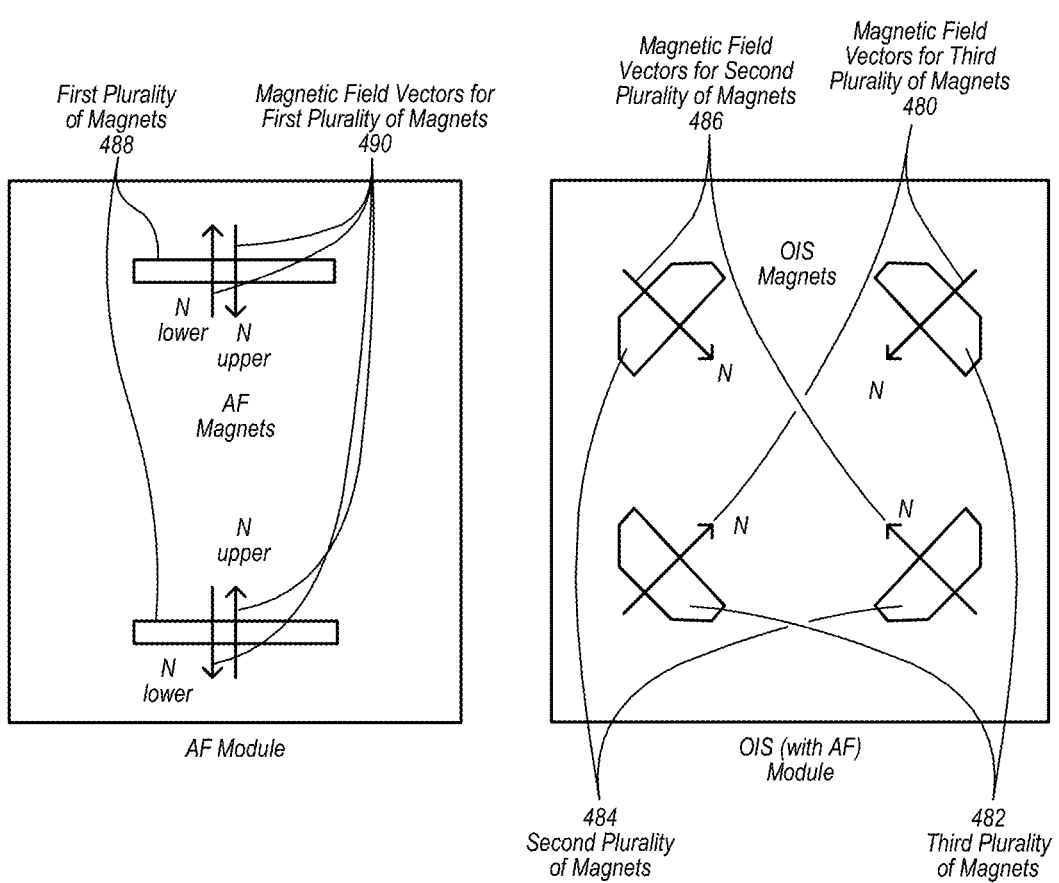
FIG. 4 illustrates arrangement of magnets in a dual camera arrangement, according to at least some embodiments.

FIG. 4 illustrates arrangement of magnets in a dual camera arrangement, according to at least some embodiments. A first plurality of magnets 488 is shown with a plurality of magnetic field vectors 490 for the first plurality of magnets. A second plurality of magnets 484 is shown with a plurality of magnetic field vectors 486 for the second plurality of magnets. A third plurality of magnets 482 is shown with a plurality of magnetic field vectors 400 for the first plurality of magnets.

In some embodiments, a first camera unit includes an autofocus actuator and a first image sensor. The autofocus actuator includes a first plurality of magnets 488 for autofocus motion control of components of a first optical package relative to the image sensor, and the first plurality of magnets is positioned to generate magnetic fields 490 aligned in parallel with a first magnetic axis at a right angle to the optical axis of the first optical package. In some embodiments, a second camera unit includes an optical image stabilization and autofocus actuator and a second image sensor. The optical image stabilization and autofocus actuator includes a second plurality of magnets 484 positioned to generate magnetic fields 486 aligned along a second magnet axis at 45-degrees to the first magnetic axis, and the second camera unit includes a third plurality of magnets 482 positioned to generate magnetic fields 480 aligned along a third magnetic axis at 135-degrees to the first magnetic axis.

Figure 5:
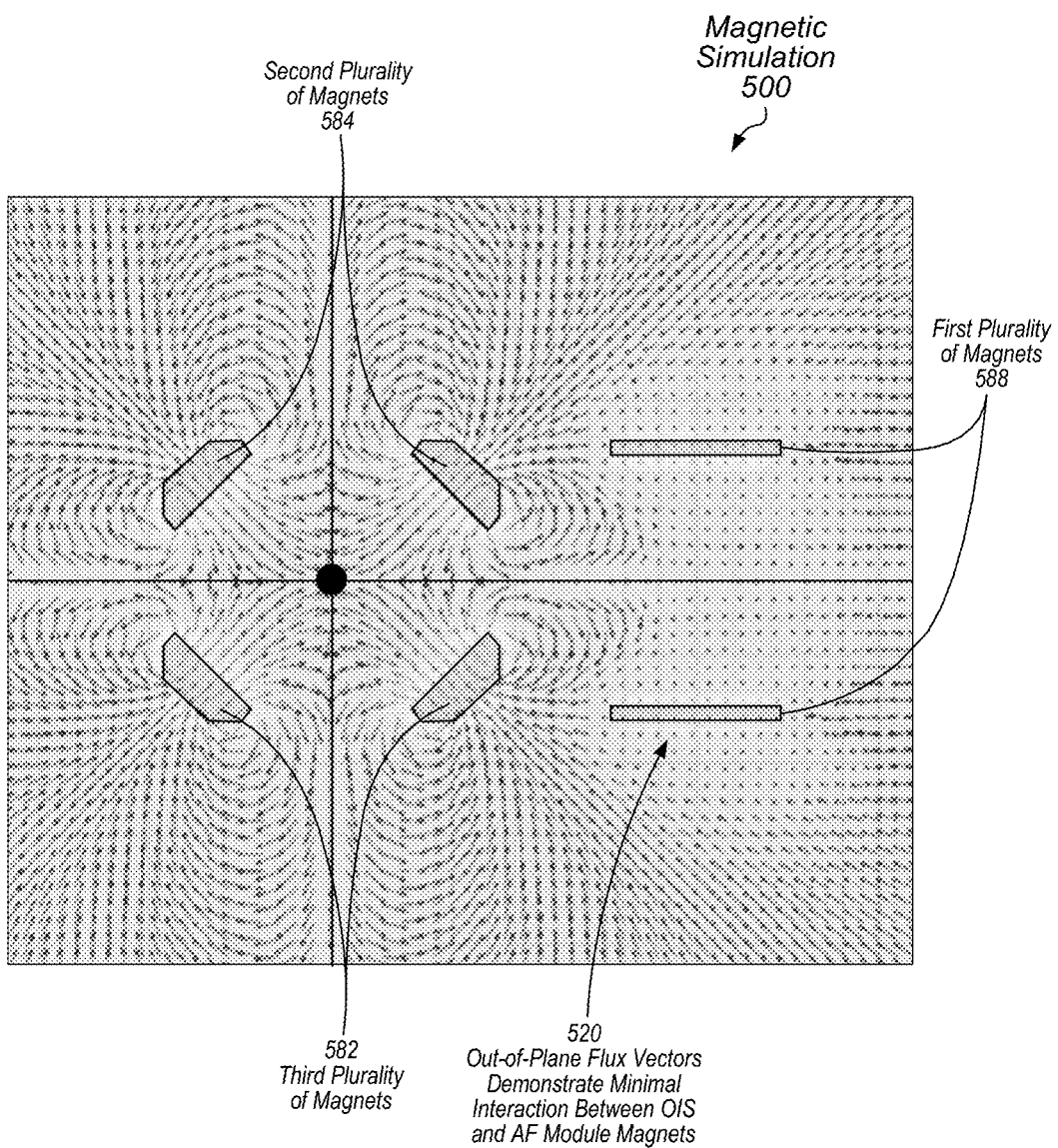
FIG. 5 depicts magnetic fields associated with magnets in a dual camera arrangement, according to at least some embodiments.

FIG. 5 depicts magnetic fields associated with magnets in a dual camera arrangement, according to at least some embodiments. A magnetic simulation 500 is shown. A first plurality of magnets 588 is shown with a plurality of magnetic field vectors for the first plurality of magnets. A second plurality of magnets 584 is shown with a plurality of magnetic field vectors for the second plurality of magnets. A third plurality of magnets 582 is shown with a plurality of magnetic field vectors for the third plurality of magnets. Out of plane flux vectors 520 demonstrate minimal interaction between the OIS and AF modules.

Figure 6:
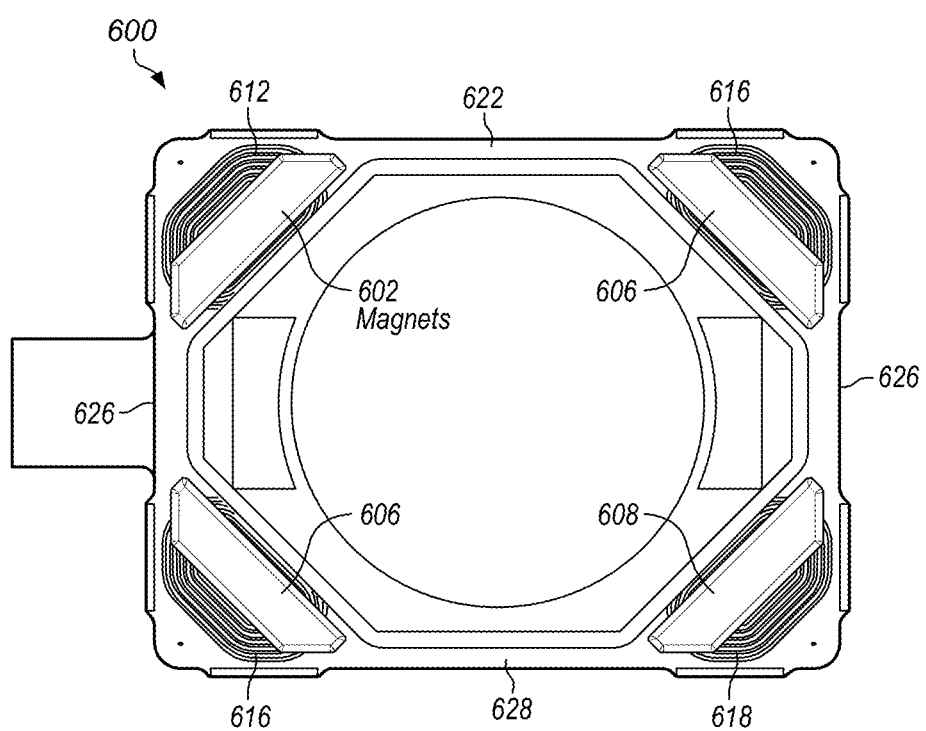
FIG. 6 illustrates an actuator in top view with the outer screening can and yoke hidden, according to some embodiments.

FIG. 6 illustrates an actuator in top view with the outer screening can and yoke hidden, according to some embodiments. Some embodiments feature advantageous arrangement of the position and orientation of the magnets 602-608, with the magnets 602-608 at the corners, where the magnet, and its poling direction are substantially 45 degrees to each side 622-628 of the actuator module 600. Optical image stabilization coils 612-618 can be seen either side of the magnets 602-608 (although one part is hidden by the autofocus coil and lens carrier). Some embodiments exploit the observation that, for some applications, the X dimension of the camera is less important than the Y dimension, and the magnets and optical image stabilization coils 612-618 are moved around the lens to eliminate any impact on the Y dimension.

Some embodiments still maintain the 45 degree angle of the magnets 602-608 and optical image stabilization coils 612-618, so that each pair of optical image stabilization coils 612-618 produces forces substantially orthogonal to the other. However, now each of optical image stabilization coils 612-618 produces a force on the autofocus mechanism that no longer acts through the optical axis, and hence generates a torque around the lens. To combat this, it may be noted that the torque produced by each of optical image stabilization coils 612-618 is nominally equal in magnitude and opposite in direction to the torque produced by its diagonally opposite partner, hence there is nominally no net torque from the pair of optical image stabilization coils 612-618.

In addition, some embodiments provide a mapping to convert the handshake tilt as measured by a tilt sensor (most typically the gyroscope) to movement of the lens in the directions of the two 45 degree axes. In some embodiments, this configuration of magnets 602-608 and optical image stabilization coils 612-618 eliminates the impact on the camera Y dimension from the presence of these components, and the use of the fringing field.

Figure 7:
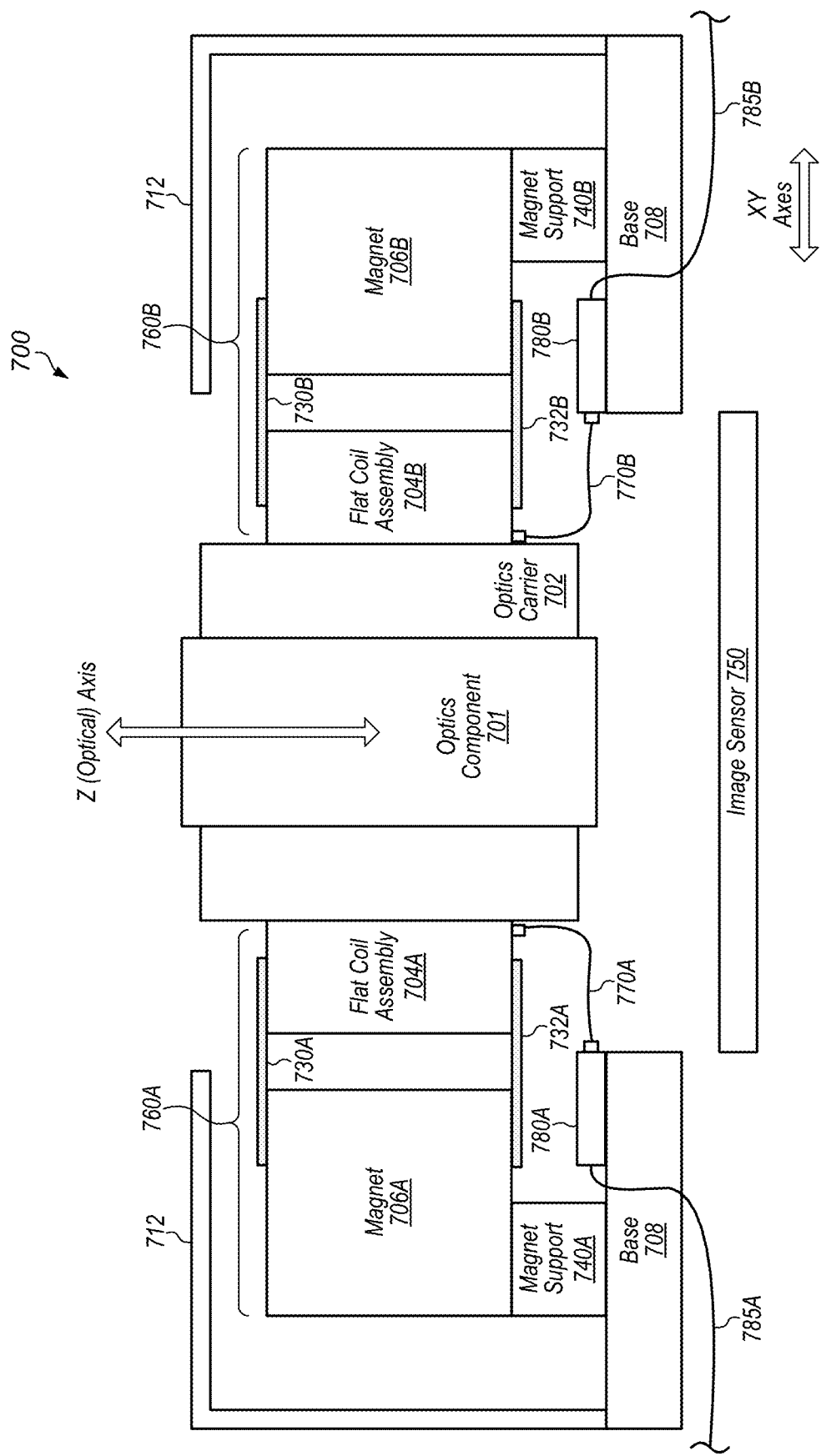
FIG. 7 illustrates a side view of an example actuator module included in a camera component and configured to adjust a mobile component which includes a lens carrier along an optical axis relative to an image sensor, according to some embodiments.

FIG. 7 illustrates a side view of an example actuator module included in a camera component and configured to adjust a mobile component which includes a lens carrier along an optical axis relative to an image sensor, according to some embodiments. The actuator module 700 can be included in the actuator module 100 illustrated in FIG. 1A-B. The flat coil assemblies 704A-B illustrated in FIG. 7 can include one or more of the flat coil assemblies illustrated in FIG. 2-6, 10.

Actuator module 700 includes a base assembly 708, magnets 706A-B, cover 712, and support elements 740A-B which collectively include a static component assembly. Image sensor 750 can be included in the static component assembly. The actuator module 700 also include an optics carrier 702 which is configured to accommodate one or more optics components 701 and includes the mobile component of the actuator module. The optics carrier 702, along with the included optics component 701, and the flat coil assemblies at least partially include the mobile component assembly of the actuator module 700. The optics carrier can include a threaded optical lens carrier, and the optics component 701 can include one or more optical lenses mounted in the carrier. The actuator module 700 can include at least two separate actuator mechanisms 760A-B which each include a separate set of magnets 706 and corresponding flat coil assemblies 704 coupled thereto via one or more spring assemblies 730, 732.

Each flat coil assembly 704A-B is electrically coupled to one or more power source connections 785A-B via a respective electrical terminal 780A-B which is included in the static component assembly of the actuator module 700. Each respective flat coil assembly 704A-B is electrically coupled to a respective electrical terminal 780A-B via a respective electrical connection 770A-B. In some embodiments, one or more electrical connections 770A-B include a flexible electrical connection which is configured to flex, as the mobile component assembly which includes the flat coil assemblies 704A-B moves along the Z axis, to maintain the electrical connection between the coupled flat coil assembly 704 and electrical terminal 780. In some embodiments, the flat coil assemblies 704A-B are electrically coupled together via an electrical circuit (not shown in FIG. 7), and each power source connection 785A-B is coupled to a common power source, such that the flat coil assemblies 704A-B are coupled to the common power source in series. In some embodiments, the flat coil assemblies 704A-B are each coupled to one or more power sources in parallel.

In the illustrated embodiment, the actuator mechanisms 760 included in the actuator modules are configured to adjustably positon the optics carrier along the optical axis to perform auto-focusing of the optics component 701 included in the optics carrier 702, relative to the image sensor 750. Such adjustably positioning can include inducing a current in one or more of the flat coil assemblies 704A-B, via the electrical terminals 780A-B, such that the one or more flat coil assemblies 704A-B generate Lorentz forces, based at least in part upon the applied current and the magnetic field generated by one or more of the magnets 906A-B. The generated Lorentz forces are applied to the optics carrier 702, thereby causing the optics carrier 702 to be moved along the optical axis to one or more particular positions. The particular position to which the optics carrier is adjustably moved along the optical axis is based at least in part upon the current applied to the one or more flat coil assemblies 704A-B.

As shown, spring assemblies 730A-B, 732A-B couple the flat coil assemblies 704A-B to corresponding magnets 706A-B. The spring assemblies exert spring forces on the mobile component assembly, via exerting spring forces upon the flat coil assemblies 704A-B, as the mobile component assembly moves relative to the static component assembly which includes the magnets 706A-B. As a result, the range of motion of the mobile component assembly is at least partially restricted, and the spring assemblies are configured to return the mobile component assembly to a particular equilibrium position, relative to at least the image sensor 750, upon an absence of current through the flat coil assemblies 704A-B, and thus Lorentz forces generated by same.

Multifunction Device Examples

Embodiments of electronic devices in which embodiments of camera systems 198 as described herein, user interfaces for such devices, and associated processes for using such devices are described. In some embodiments, the device is a portable communications device, such as a mobile telephone, that also contains other functions, such as PDA and/or music player functions. Other portable electronic devices, such as laptops, cell phones, pad devices, or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera device.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may one or more common physical user-interface devices, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 8:
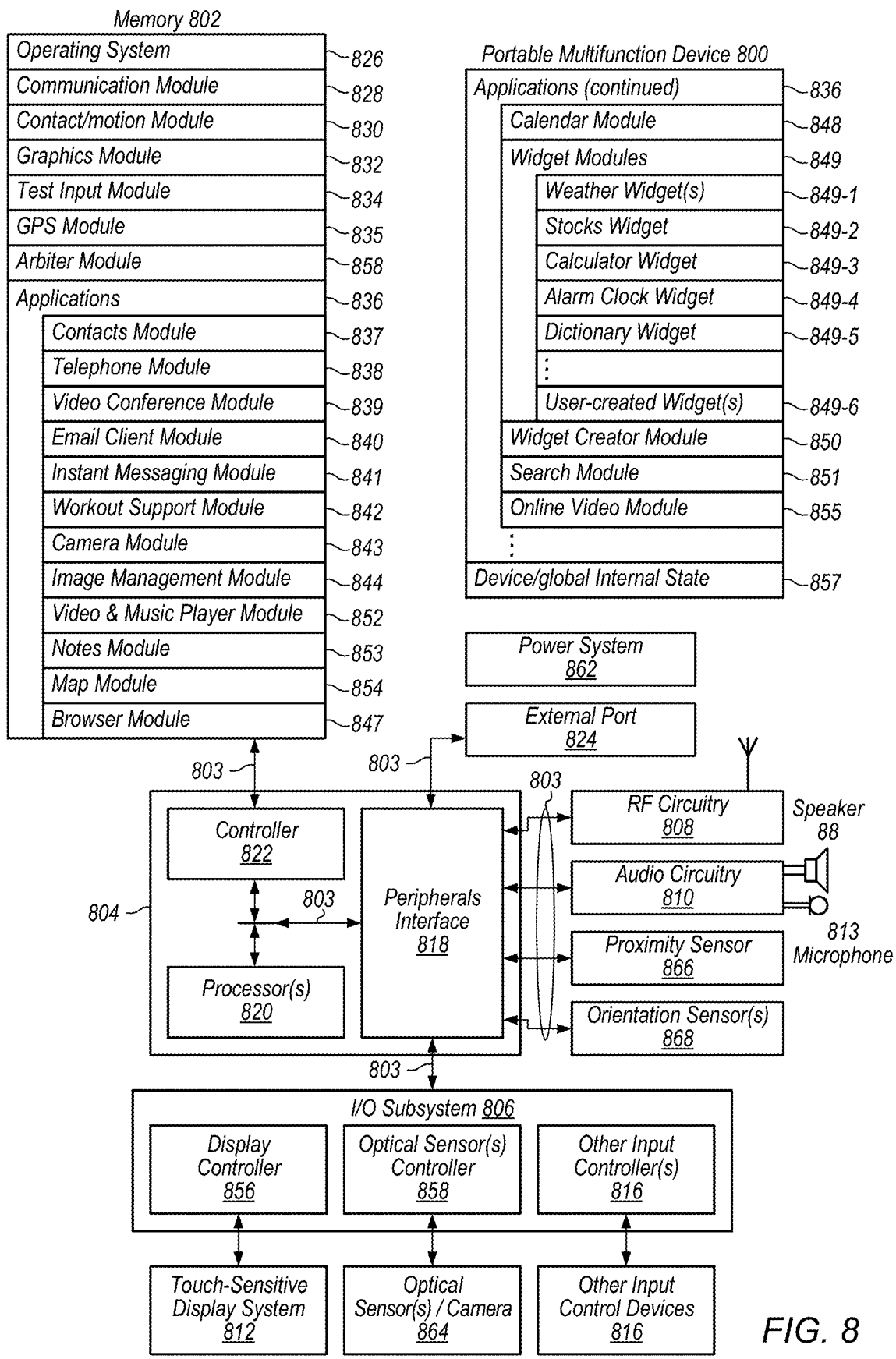
FIG. 8 illustrates a block diagram of a portable multifunction device with a camera, according to some embodiments.

Attention is now directed toward embodiments of portable devices with cameras. FIG. 8 is a block diagram illustrating portable multifunction device 800 with camera 864 in accordance with some embodiments. Camera 864 is sometimes called an "optical sensor" for convenience, and may also be known as or called an optical sensor system. Embodiments of an actuator module 100, 700, etc., including one or more actuator modules that includes passive damping for auto-focusing, may be used in the optical sensor/camera(s) 864 of a device 800.

Device 800 may include memory 802 (which may include one or more computer readable storage mediums), memory controller 822, one or more processing units (CPU's) 820, peripherals interface 818, RF circuitry 808, audio circuitry 810, speaker 88, touch-sensitive display system 812, microphone 813, input/output (I/O) subsystem 806, other input or control devices 816, and external port 824. Device 800 may include one or more optical sensors 864. These components may communicate over one or more communication buses or signal lines 803.

It should be appreciated that device 800 is only one example of a portable multifunction device, and that device 800 may have more or fewer components than shown, may combine two or more components, or may have a different configuration or arrangement of the components. The various components shown in FIG. 8 may be implemented in hardware, software, or a combination of hardware and software, including one or more signal processing and/or application specific integrated circuits.

Memory 802 may include high-speed random access memory and may also include non-volatile memory, such as one or more magnetic disk storage devices, flash memory devices, or other non-volatile solid-state memory devices. Access to memory 802 by other components of device 800, such as CPU 820 and the peripherals interface 818, may be controlled by memory controller 822.

Peripherals interface 818 can be used to couple input and output peripherals of the device to CPU 820 and memory 802. The one or more processors 820 run or execute various software programs and/or sets of instructions stored in memory 802 to perform various functions for device 800 and to process data.

In some embodiments, peripherals interface 818, CPU 820, and memory controller 822 may be implemented on a single chip, such as chip 804. In some other embodiments, they may be implemented on separate chips.

RF (radio frequency) circuitry 808 receives and sends RF signals, also called electromagnetic signals. RF circuitry 808 converts electrical signals to/from electromagnetic signals and communicates with communications networks and other communications devices via the electromagnetic signals. RF circuitry 808 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 808 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.8a, IEEE 802.8b, IEEE 802.8g and/or IEEE 802.8n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 810, speaker 88, and microphone 813 provide an audio interface between a user and device 800.

Audio circuitry 810 receives audio data from peripherals interface 818, converts the audio data to an electrical signal, and transmits the electrical signal to speaker 88. Speaker 88 converts the electrical signal to human-audible sound waves. Audio circuitry 810 also receives electrical signals converted by microphone 813 from sound waves. Audio circuitry 810 converts the electrical signal to audio data and transmits the audio data to peripherals interface 818 for processing. Audio data may be retrieved from and/or transmitted to memory 102 and/or RF circuitry 808 by peripherals interface 818. In some embodiments, audio circuitry 810 also includes a headset jack (e.g., 812, FIG. 8). The headset jack provides an interface between audio circuitry 810 and removable audio input/output peripherals, such as output-only headphones or a headset with both output (e.g., a headphone for one or both ears) and input (e.g., a microphone).

I/O subsystem 806 couples input/output peripherals on device 800, such as touch screen 812 and other input control devices 816, to peripherals interface 818. I/O subsystem 806 may include display controller 856 and one or more input controllers 860 for other input or control devices. The one or more input controllers 860 receive/send electrical signals from/to other input or control devices 816. The other input control devices 816 may include physical buttons (e.g., push buttons, rocker buttons, etc.), dials, slider switches, joysticks, click wheels, and so forth. In some alternative embodiments, input controller(s) 860 may be coupled to any (or none) of the following: a keyboard, infrared port, USB port, and a pointer device such as a mouse. The one or more buttons (e.g., 808, FIG. 8) may include an up/down button for volume control of speaker 88 and/or microphone 813. The one or more buttons may include a push button (e.g., 806, FIG. 8).

Touch-sensitive display 812 provides an input interface and an output interface between the device and a user. Display controller 856 receives and/or sends electrical signals from/to touch screen 812. Touch screen 812 displays visual output to the user. The visual output may include graphics, text, icons, video, and any combination thereof (collectively termed "graphics"). In some embodiments, some or all of the visual output may correspond to user-interface objects.

Touch screen 812 has a touch-sensitive surface, sensor or set of sensors that accepts input from the user based on haptic and/or tactile contact. Touch screen 812 and display controller 856 (along with any associated modules and/or sets of instructions in memory 802) detect contact (and any movement or breaking of the contact) on touch screen 812 and converts the detected contact into interaction with user-interface objects (e.g., one or more soft keys, icons, web pages or images) that are displayed on touch screen 812. In an example embodiment, a point of contact between touch screen 812 and the user corresponds to a finger of the user.

Touch screen 812 may use LCD (liquid crystal display) technology, LPD (light emitting polymer display) technology, or LED (light emitting diode) technology, although other display technologies may be used in other embodiments. Touch screen 812 and display controller 856 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 812. In an example embodiment, projected mutual capacitance sensing technology may be used.

Touch screen 812 may have a video resolution in excess of 100 dots per inch (dpi). In some embodiments, the touch screen has a video resolution of approximately 160 dpi. The user may make contact with touch screen 812 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 800 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 812 or an extension of the touch-sensitive surface formed by the touch screen.

Device 800 also includes power system 862 for powering the various components. Power system 862 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 800 may also include one or more optical sensors or cameras 864. FIG. 8 shows an optical sensor coupled to optical sensor controller 858 in I/O subsystem 806. Optical sensor 864 may include charge-coupled device (CCD) or complementary metal-oxide semiconductor (CMOS) phototransistors. Optical sensor 864 receives light from the environment, projected through one or more lens, and converts the light to data representing an image. In conjunction with imaging module 843 (also called a camera module), optical sensor 864 may capture still images or video. In some embodiments, an optical sensor is located on the back of device 800, opposite touch screen display 812 on the front of the device, so that the touch screen display may be used as a viewfinder for still and/or video image acquisition. In some embodiments, another optical sensor is located on the front of the device so that the user's image may be obtained for videoconferencing while the user views the other videoconference participants on the touch screen display.

Device 800 may also include one or more proximity sensors 866. FIG. 8 shows proximity sensor 866 coupled to peripherals interface 818. Alternatively, proximity sensor 866 may be coupled to input controller 860 in I/O subsystem 806. In some embodiments, the proximity sensor turns off and disables touch screen 812 when the multifunction device is placed near the user's ear (e.g., when the user is making a phone call).

Device 800 includes one or more orientation sensors 868. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 800. In some embodiments, the one or more orientation sensors include any combination of orientation/rotation sensors. FIG. 8 shows the one or more orientation sensors 868 coupled to peripherals interface 818. Alternatively, the one or more orientation sensors 868 may be coupled to an input controller 860 in I/O subsystem 806. In some embodiments, information is displayed on the touch screen display in a portrait view or a landscape view based on an analysis of data received from the one or more orientation sensors.

In some embodiments, the software components stored in memory 802 include operating system 826, communication module (or set of instructions) 828, contact/motion module (or set of instructions) 830, graphics module (or set of instructions) 832, text input module (or set of instructions) 834, Global Positioning System (GPS) module (or set of instructions) 835, arbiter module 857 and applications (or sets of instructions) 836. Furthermore, in some embodiments memory 802 stores device/global internal state 857, as shown in FIGS. 1A-B and 7. Device/global internal state 857 includes one or more of: active application state, indicating which applications, if any, are currently active; display state, indicating what applications, views or other information occupy various regions of touch screen display 812; sensor state, including information obtained from the device's various sensors and input control devices 816; and location information concerning the device's location and/or attitude.

Operating system 826 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 828 facilitates communication with other devices over one or more external ports 824 and also includes various software components for handling data received by RF circuitry 808 and/or external port 824. External port 824 (e.g., Universal Serial Bus (USB), FIREWIRE, etc.) is adapted for coupling directly to other devices or indirectly over a network (e.g., the Internet, wireless LAN, etc.).

Contact/motion module 830 may detect contact with touch screen 812 (in conjunction with display controller 856) and other touch sensitive devices (e.g., a touchpad or physical click wheel). Contact/motion module 830 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 830 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 830 and display controller 856 detect contact on a touchpad.

Contact/motion module 830 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 832 includes various known software components for rendering and displaying graphics on touch screen 812 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 832 stores data representing graphics to be used. Each graphic may be assigned a corresponding code. Graphics module 832 receives, from applications etc., one or more codes specifying graphics to be displayed along with, if necessary, coordinate data and other graphic property data, and then generates screen image data to output to display controller 856.

Text input module 834, which may be a component of graphics module 832, provides soft keyboards for entering text in various applications (e.g., contacts 837, e-mail 840, IM 141, browser 847, and any other application that needs text input).

GPS module 835 determines the location of the device and provides this information for use in various applications (e.g., to telephone 838 for use in location-based dialing, to camera module 843 as picture/video metadata, and to applications that provide location-based services such as weather widgets, local yellow page widgets, and map/navigation widgets).

Applications 836 may include the following modules (or sets of instructions), or a subset or superset thereof:
  contacts module 837 (sometimes called an address book or contact list);
  telephone module 838;
  video conferencing module 839;
  e-mail client module 840;
  instant messaging (IM) module 841;
  workout support module 842;
  camera module 843 for still and/or video images;
  image management module 844;
  browser module 847;
  calendar module 848;
  widget modules 849, which may include one or more of: weather widget 849-1, stocks widget 849-2, calculator widget 849-3, alarm clock widget 849-4, dictionary widget 849-5, and other widgets obtained by the user, as well as user-created widgets 849-6;
  widget creator module 850 for making user-created widgets 849-6;
  search module 851;

video and music player module 852, which may be made up of a video player module and a music player module;
notes module 853;
map module 854; and/or
online video module 855.

Examples of other applications 836 that may be stored in memory 802 include other word processing applications, other image editing applications, drawing applications, presentation applications, JAVA-enabled applications, encryption, digital rights management, voice recognition, and voice replication.

In conjunction with touch screen 812, display controller 856, contact module 830, graphics module 832, and text input module 834, contacts module 837 may be used to manage an address book or contact list (e.g., stored in application internal state 892 of contacts module 837 in memory 802), including: adding name(s) to the address book; deleting name(s) from the address book; associating telephone number(s), e-mail address(es), physical address (es) or other information with a name; associating an image with a name; categorizing and sorting names; providing telephone numbers or e-mail addresses to initiate and/or facilitate communications by telephone 838, video conference 839, e-mail 840, or IM 841; and so forth.

In conjunction with RF circuitry 808, audio circuitry 810, speaker 88, microphone 813, touch screen 812, display controller 856, contact module 830, graphics module 832, and text input module 834, telephone module 838 may be used to enter a sequence of characters corresponding to a telephone number, access one or more telephone numbers in address book 837, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 808, audio circuitry 810, speaker 88, microphone 813, touch screen 812, display controller 856, optical sensor 864, optical sensor controller 858, contact module 830, graphics module 832, text input module 834, contact list 837, and telephone module 838, videoconferencing module 89 includes executable instructions to initiate, conduct, and terminate a video conference between a user and one or more other participants in accordance with user instructions.

In conjunction with RF circuitry 808, touch screen 812, display controller 856, contact module 830, graphics module 832, and text input module 834, e-mail client module 840 includes executable instructions to create, send, receive, and manage e-mail in response to user instructions. In conjunction with image management module 844, e-mail client module 840 makes it very easy to create and send e-mails with still or video images taken with camera module 843.

In conjunction with RF circuitry 808, touch screen 812, display controller 856, contact module 830, graphics module 832, and text input module 834, the instant messaging module 841 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 808, touch screen 812, display controller 856, contact module 830, graphics module 832, text input module 834, GPS module 835, map module 854, and music player module 846, workout support module 842 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 812, display controller 856, optical sensor(s) 864, optical sensor controller 858, contact module 830, graphics module 832, and image management module 844, camera module 843 includes executable instructions to capture still images or video (including a video stream) and store them into memory 802, modify characteristics of a still image or video, or delete a still image or video from memory 802.

In conjunction with touch screen 812, display controller 856, contact module 830, graphics module 832, text input module 834, and camera module 843, image management module 844 includes executable instructions to arrange, modify (e.g., edit), or otherwise manipulate, label, delete, present (e.g., in a digital slide show or album), and store still and/or video images.

In conjunction with RF circuitry 808, touch screen 812, display system controller 856, contact module 830, graphics module 832, and text input module 834, browser module 847 includes executable instructions to browse the Internet in accordance with user instructions, including searching, linking to, receiving, and displaying web pages or portions thereof, as well as attachments and other files linked to web pages.

In conjunction with RF circuitry 808, touch screen 812, display system controller 856, contact module 830, graphics module 832, text input module 834, e-mail client module 840, and browser module 847, calendar module 848 includes executable instructions to create, display, modify, and store calendars and data associated with calendars (e.g., calendar entries, to do lists, etc.) in accordance with user instructions.

In conjunction with RF circuitry 808, touch screen 812, display system controller 856, contact module 830, graphics module 832, text input module 834, and browser module 847, widget modules 849 are mini-applications that may be downloaded and used by a user (e.g., weather widget 849-1, stocks widget 849-2, calculator widget 8493, alarm clock widget 849-4, and dictionary widget 849-5) or created by the user (e.g., user-created widget 849-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 808, touch screen 812, display system controller 856, contact module 830, graphics module 832, text input module 834, and browser module 847, the widget creator module 850 may be used by a user to create widgets (e.g., turning a user-specified portion of a web page into a widget).

In conjunction with touch screen 812, display system controller 856, contact module 830, graphics module 832, and text input module 834, search module 851 includes executable instructions to search for text, music, sound, image, video, and/or other files in memory 802 that match one or more search criteria (e.g., one or more user-specified search terms) in accordance with user instructions.

In conjunction with touch screen 812, display system controller 856, contact module 830, graphics module 832, audio circuitry 810, speaker 88, RF circuitry 808, and browser module 847, video and music player module 852 includes executable instructions that allow the user to download and play back recorded music and other sound files stored in one or more file formats, such as MP3 or AAC files, and executable instructions to display, present or otherwise play back videos (e.g., on touch screen 812 or on an external, connected display via external port 824). In some embodiments, device 800 may include the functionality of an MP3 player.

In conjunction with touch screen 812, display controller 856, contact module 830, graphics module 832, and text input module 834, notes module 853 includes executable instructions to create and manage notes, to do lists, and the like in accordance with user instructions.

In conjunction with RF circuitry 808, touch screen 812, display system controller 856, contact module 830, graphics module 832, text input module 834, GPS module 835, and browser module 847, map module 854 may be used to receive, display, modify, and store maps and data associated with maps (e.g., driving directions; data on stores and other points of interest at or near a particular location; and other location-based data) in accordance with user instructions.

In conjunction with touch screen 812, display system controller 856, contact module 830, graphics module 832, audio circuitry 810, speaker 88, RF circuitry 808, text input module 834, e-mail client module 840, and browser module 847, online video module 855 includes instructions that allow the user to access, browse, receive (e.g., by streaming and/or download), play back (e.g., on the touch screen or on an external, connected display via external port 824), send an e-mail with a link to a particular online video, and otherwise manage online videos in one or more file formats, such as H.264. In some embodiments, instant messaging module 841, rather than e-mail client module 840, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 802 may store a subset of the modules and data structures identified above. Furthermore, memory 802 may store additional modules and data structures not described above.

In some embodiments, device 800 is a device where operation of a predefined set of functions on the device is performed exclusively through a touch screen and/or a touchpad. By using a touch screen and/or a touchpad as the primary input control device for operation of device 800, the number of physical input control devices (such as push buttons, dials, and the like) on device 800 may be reduced.

The predefined set of functions that may be performed exclusively through a touch screen and/or a touchpad include navigation between user interfaces. In some embodiments, the touchpad, when touched by the user, navigates device 800 to a main, home, or root menu from any user interface that may be displayed on device 800. In such embodiments, the touchpad may be referred to as a "menu button." In some other embodiments, the menu button may be a physical push button or other physical input control device instead of a touchpad.

Figure 9:
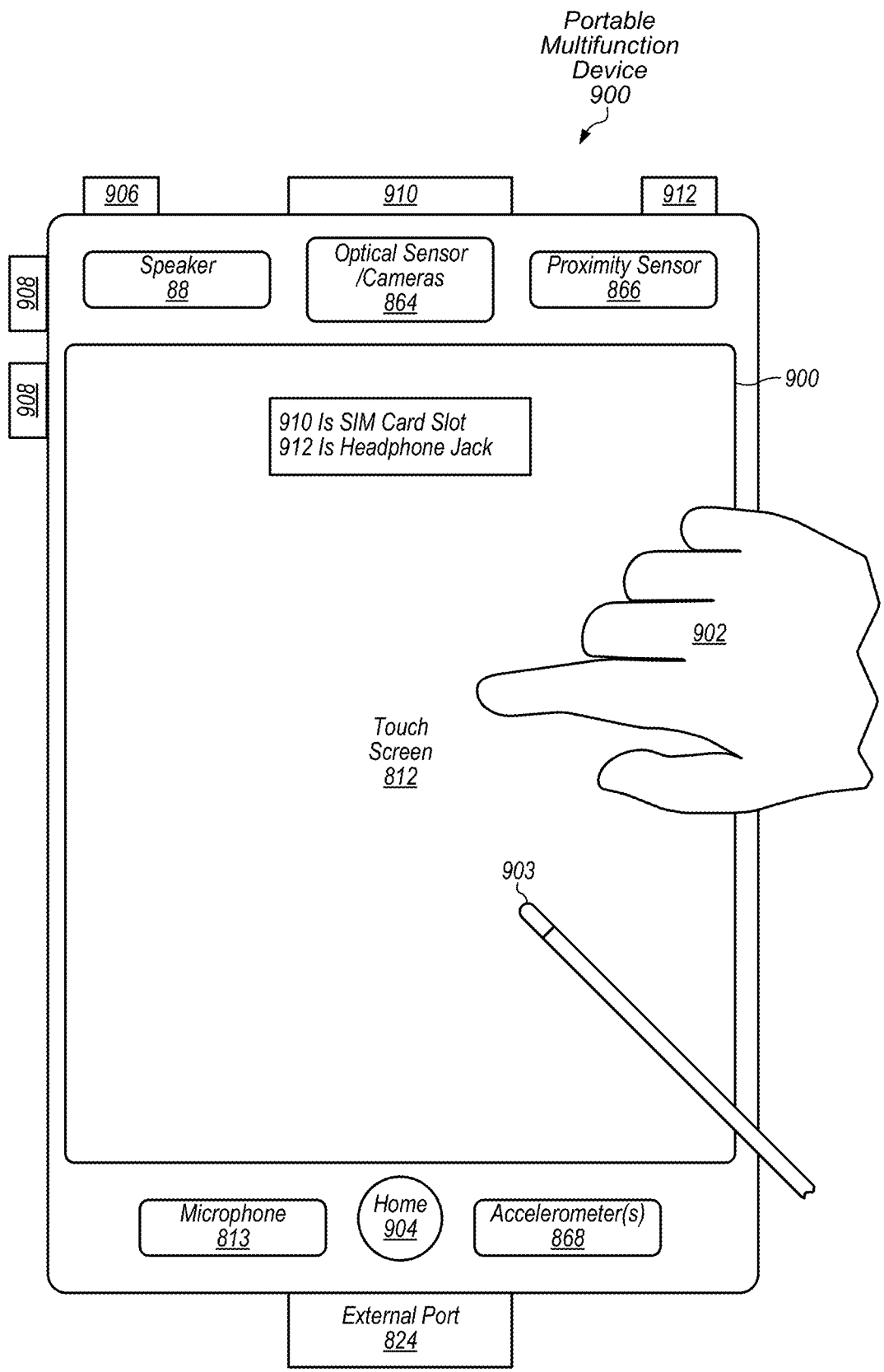
FIG. 9 depicts a portable multifunction device having a camera, according to some embodiments.

FIG. 9 illustrates a portable multifunction device 800 having a touch screen 812 and a camera system 864 in accordance with some embodiments. The touch screen may display one or more graphics within user interface (UI) 900. In this embodiment, as well as others described below, a user may select one or more of the graphics by making a gesture on the graphics, for example, with one or more fingers 902 (not drawn to scale in the Figure) or one or more styluses 903 (not drawn to scale in the figure).

Device 800 may also include one or more physical buttons, such as "home" or menu button 904. As described previously, menu button 904 may be used to navigate to any application 836 in a set of applications that may be executed on device 800. Alternatively, in some embodiments, the menu button is implemented as a soft key in a graphics user interface (GUI) displayed on touch screen 812.

In one embodiment, device 800 includes touch screen 812, menu button 904, push button 906 for powering the device on/off and locking the device, volume adjustment button(s) 908, Subscriber Identity Module (SIM) card slot 910, head set jack 99, and docking/charging external port 824. Push button 906 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 800 also may accept verbal input for activation or deactivation of some functions through microphone 813.

It should be noted that, although many of the examples herein are given with reference to optical sensor/camera 864 (on the front of a device), a rear-facing camera system or optical sensor that is pointed opposite from the display may be used instead of or in addition to an optical sensor/camera or camera system 864 on the front of a device. Embodiments of camera system as described herein that includes passive damping for optical image stabilization (OIS) may be used in the optical sensor/camera(s) 864.

Example Computer System

Figure 10:
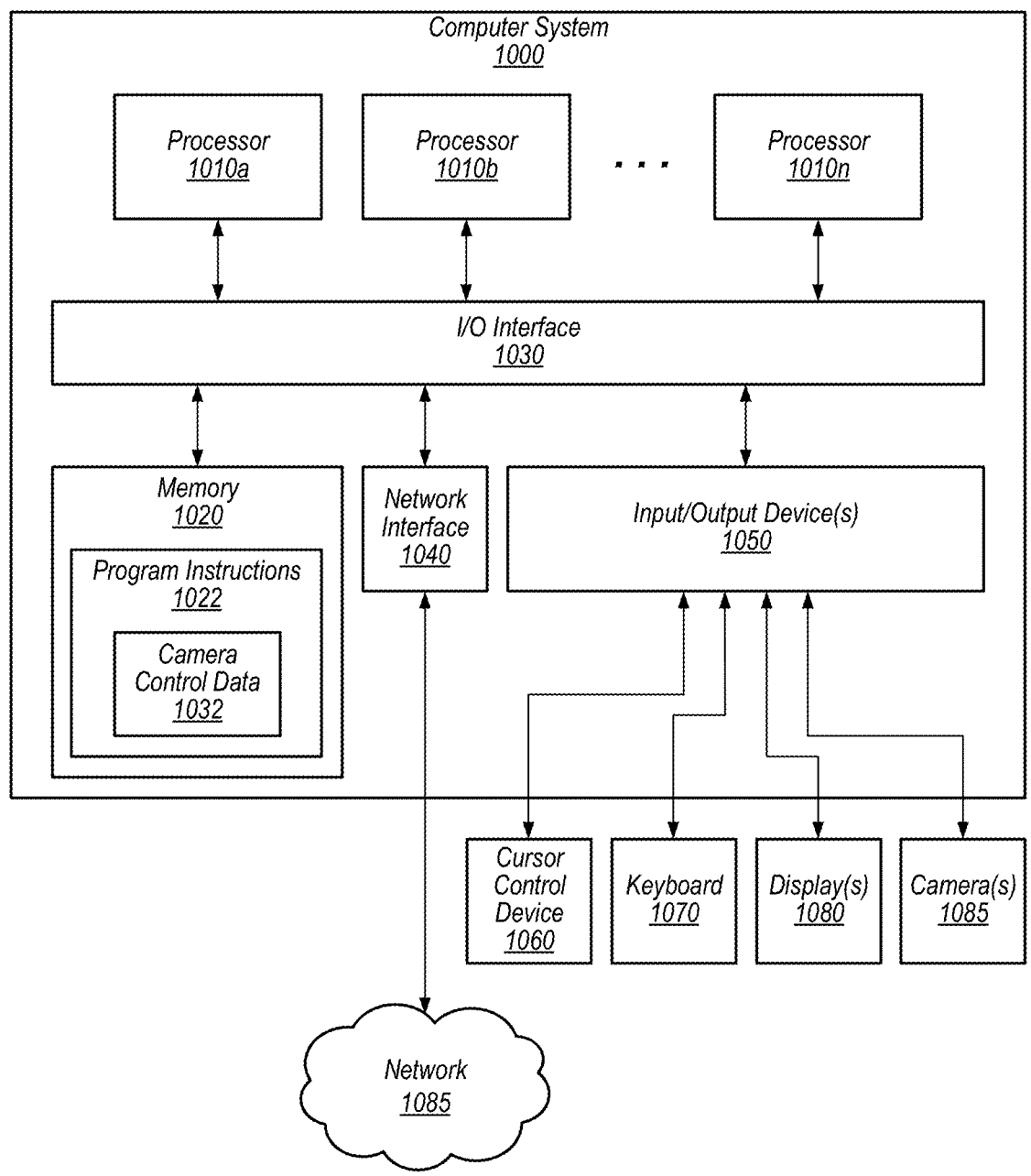
FIG. 10 illustrates an example computer system configured to implement aspects of a system and method for camera control, according to some embodiments.

FIG. 10 illustrates an example computer system 1000 that may be configured to include or execute any or all of the embodiments described above. In different embodiments, computer system 1000 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, may be executed in one or more computer systems 1000, which may interact with various other devices. Note that any component, action, or functionality described above with respect to FIGS. 1 through 9 may be implemented on one or more computers configured as computer system 1000 of FIG. 10, equipped with cameras 1090 and camera systems as input/output devices 1050 according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x8 10, PowerPC, SPARC, or MIPS ISAs, or any other suitable ISA. In multiprocessor systems, each of processors 1010 may commonly, but not necessarily, implement the same ISA.

System memory 1020 may be configured to store camera control program instructions 1022 and/or camera control data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1022 may be configured to implement a lens control application 1024 incorporating any of the functionality described above. Additionally, existing camera control data 1032 of memory 1020 may include any of the information or data structures described above. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., carrier or agent devices) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1022, which may be processor-executable to implement any element or action described above. In one embodiment, the program instructions may implement the methods described above. In other embodiments, different elements and data may be included. Note that data may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   a first camera unit, comprising:
     a first mobile component;
     a first static component; and
     a first actuator to move the first mobile component relative to the first static component, the first actuator comprising a plurality of paired magnets including a first magnet pair of two magnets having magnetic fields oriented in opposite directions, and a second magnet pair of two magnets having magnetic fields oriented in opposite directions; and
   a second camera unit, comprising:
     a second mobile component;
     a second static component; and
     a second actuator to move the second mobile component relative to the second static component, the second actuator comprising a plurality of individual magnets positioned to generate magnetic fields in different directions at different locations in the second camera unit,
   wherein a magnet arrangement of the first actuator differs from a magnet arrangement of the second actuator.

2. The system of claim 1, wherein the first actuator comprises:
   a first autofocus actuator to move, relative to the first static component, the first mobile component along a first optical axis of the first camera unit.

3. The system of claim 1, wherein the second actuator comprises at least one of:
   a second autofocus actuator to move, relative to the second static component, the second mobile component along a second optical axis of the second camera unit; or
   an optical image stabilization actuator to move, relative to the second static component, the second mobile component in one or more directions orthogonal to the second optical axis.

4. The system of claim 1, wherein a magnet of the plurality of paired magnets extends in a direction parallel to a side of the first camera unit.

5. The system of claim 1, wherein the plurality of paired magnets comprises:
   a first set of one or more magnets extending parallel to a side of the first camera unit such that a poling direction of the first set of one or more magnets is perpendicular to the side, wherein the first set of one or more side magnets is located between the side and a first optical package of the first camera unit; and
   a second set of one or more magnets extending parallel to the side of the first camera unit, wherein the second set of one or more magnets is opposite in poling direction to the first set of one or more magnets with respect to the first optical package.

6. The system of claim 5, wherein:
   the first set of one or more magnets comprises:
     a first upper magnet located proximate a first side of the first camera unit; and
     a first lower magnet below the first upper magnet; and
   the second set of one or more magnets comprises:
     a second upper magnet located proximate a second side of the first camera unit that is opposite the first side; and
     a second lower magnet below the second upper magnet.

7. The system of claim 1, wherein each magnet of the plurality of individual magnets is oriented at a non-zero angle to at least one side of the second camera unit.

8. A multifunction device, comprising:
   a camera system, comprising:
     a first camera unit, comprising:
       a first mobile component;
       a first static component; and
       a first actuator to move the first mobile component relative to the first static component, the first actuator comprising a plurality of paired magnets including a first magnet pair of two magnets having magnetic fields oriented in opposite directions, and a second magnet pair of two magnets having magnetic fields oriented in opposite directions; and
     a second camera unit, comprising:
       a second mobile component;
       a second static component; and
       a second actuator to move the second mobile component relative to the second static component, the second actuator comprising a plurality of individual magnets positioned to generate magnetic fields in different directions at different locations in the second camera unit, wherein a magnet arrangement of the first actuator differs from a magnet arrangement of the second actuator;

one or more processors; and memory storing program instructions that are executable by the one or more processors to control operation of the camera system and to perform one or more other functions of the multifunction device.

9. The multifunction device of claim 8, wherein:

the first actuator comprises:
- a first autofocus actuator to move, relative to the first static component, the first mobile component along a first optical axis of the first camera unit; and the second actuator comprises at least one of:
- a second autofocus actuator to move, relative to the second static component, the second mobile component along a second optical axis of the second camera unit; or
- an optical image stabilization actuator to move, relative to the second static component, the second mobile component in one or more directions orthogonal to the second optical axis.

10. The multifunction device of claim 8, wherein a magnet of the plurality of paired magnets extends in a direction parallel to a side of the first camera unit.

11. The multifunction device of claim 8, wherein the plurality of magnet pairs comprises:
- a first set of one or more side magnets extending parallel to a side of the first camera unit such that a poling direction of the first set of one or more magnets is perpendicular to the side of the first camera unit, wherein the first set of one or more side magnets is located between the side and a first optical package of the first camera unit; and
- a second set of one or more side magnets extending parallel to the side of the first camera unit, wherein the second set of one or more side magnets is opposite the first set of one or more side magnets with respect to the first optical package.

12. The multifunction device of claim 11, wherein:

the first set of one or more side magnets comprises:
- a first upper magnet located proximate a first side of the first camera unit; and
- a first lower magnet below the first upper magnet; and the second set of one or more side magnets comprises:
- a second upper magnet located proximate a second side of the first camera unit that is opposite the first side; and
- a second lower magnet below the second upper magnet.

13. The multifunction device of claim 8, wherein each magnet of the plurality of individual magnets is oriented at a non-zero angle to at least one side of the second camera unit.

14. The multifunction device of claim 8, wherein the first camera unit is located adjacent to the second camera unit.

15. A system, comprising:
a first actuator to move a first mobile component of a first camera unit relative to a first static component of the first camera unit, the first actuator comprising a plurality of paired magnets including a first magnet pair of two magnets having magnetic fields oriented in opposite directions, and a second magnet pair of two magnets having magnetic fields oriented in opposite directions; and a second actuator to move a second mobile component of a second camera unit relative to a second static component of the second camera unit, the second actuator comprising a plurality of individual magnets positioned to generate magnetic fields in different directions at different locations in the second camera unit, wherein a magnet arrangement of the first actuator differs from a magnet arrangement of the second actuator.

16. The system of claim 15, wherein the first actuator comprises:
- a first autofocus actuator to move, relative to the first static component, the first mobile component along a first optical axis of the first camera unit.

17. The system of claim 15, wherein the second actuator comprises at least one of:
- a second autofocus actuator to move, relative to the second static component, the second mobile component along a second optical axis of the second camera unit; or
- an optical image stabilization actuator to move, relative to the second static component, the second mobile component in one or more directions orthogonal to the second optical axis.

18. The system of claim 15, wherein a magnet of the plurality of paired magnets is configured to extend in a direction parallel to a side of the first camera unit.

19. The system of claim 15, wherein:

the plurality of paired magnets comprises:
- a first pair of magnets configured to extend proximate a first side of the first camera unit, the first pair of magnets comprising:
  - a first upper magnet; and
  - a first lower magnet below the first upper magnet; and
- a second pair of magnets configured to extend proximate a second side of the first camera unit, the second pair of magnets comprising:
  - a second upper magnet opposite the first upper magnet; and
  - a second lower magnet below the second upper magnet; and each magnet of the plurality of individual magnets is configured to extend at a non-zero angle to at least one side of the second camera unit.

20. The system of claim 19, wherein:

the first actuator further comprises a first set of coils;

each magnet of the first pair of magnets and the second pair of magnets is configured to magnetically interact with at least one coil of the first set of coils;

the second actuator further comprises a second set of coils; and each individual magnet of the plurality of individual magnets is configured to magnetically interact with at least one coil of the second set of coils.

* * * * *